United States Patent
Morris et al.

(10) Patent No.: US 10,712,458 B2
(45) Date of Patent: Jul. 14, 2020

(54) SEISMIC SURVEYS WITH OPTICAL COMMUNICATION LINKS

(71) Applicant: MAGSEIS FF LLC, Houston, TX (US)

(72) Inventors: Michael Morris, Sugar Land, TX (US); Tom O'Brien, Sugar Land, TX (US)

(73) Assignee: MAGSEIS FF LLC, Houston, TX (US)

( * ) Notice: Subject to any disclaimer, the term of this patent is extended or adjusted under 35 U.S.C. 154(b) by 0 days.

(21) Appl. No.: 15/625,708

(22) Filed: Jun. 16, 2017

(65) Prior Publication Data
US 2018/0003836 A1    Jan. 4, 2018

Related U.S. Application Data

(60) Provisional application No. 62/357,118, filed on Jun. 30, 2016, provisional application No. 62/357,136, (Continued)

(51) Int. Cl.
*G01V 1/22* (2006.01)
*G01V 1/38* (2006.01)
(Continued)

(52) U.S. Cl.
CPC ............... *G01V 1/226* (2013.01); *G01V 1/22* (2013.01); *G01V 1/24* (2013.01); *G01V 1/3852* (2013.01);
(Continued)

(58) Field of Classification Search
CPC .... G01V 1/226; G01V 1/3808; G01V 1/3852; G01V 2200/12; G01V 13/00; G01V 1/22; G01S 11/12; G01L 27/002
See application file for complete search history.

(56) References Cited

U.S. PATENT DOCUMENTS

| 3,243,592 A | 3/1966 | Kyi et al. |
| 4,394,573 A | 7/1983 | Correa et al. |

(Continued)

FOREIGN PATENT DOCUMENTS

| CN | 1424592 A | 6/2003 |
| CN | 101228719 | 7/2008 |

(Continued)

OTHER PUBLICATIONS

"WHOI Scientists and Engineers Partner with World-Renowned Companies to Market Revolutionary New Instruments," www.whoi.edu, Jul. 19, 2012.
(Continued)

*Primary Examiner* — Ian J Lobo
(74) *Attorney, Agent, or Firm* — Foley & Lardner LLP

(57) ABSTRACT

Systems and methods of optical link communication with seismic data acquisition units are provided. The systems and methods can perform at least portions of seismic data acquisition survey. A plurality of seismic data acquisition units can be deployed on a seabed. An optical communications link can be established between an extraction vehicle and at least one of the seismic data acquisition units. A frequency of the at least one seismic data acquisition unit can be syntonized or synchronized via the optical communications link. The at least one seismic data acquisition unit can be instructed to enter a low power state subsequent to syntonizing the frequency of the at least one seismic data acquisition unit. The seismic data acquisition unit can exit the low power state and acquire seismic data in an operational state.

19 Claims, 14 Drawing Sheets

Related U.S. Application Data filed on Jun. 30, 2016, provisional application No. 62/357,145, filed on Jun. 30, 2016.

(51) Int. Cl.
  *G01V 1/24* (2006.01)
  *G01L 27/00* (2006.01)
  *G01V 13/00* (2006.01)
  *G01S 11/12* (2006.01)

(52) U.S. Cl.
  CPC ............ *G01L 27/002* (2013.01); *G01S 11/12* (2013.01); *G01V 13/00* (2013.01)

(56) References Cited

U.S. PATENT DOCUMENTS

| | | | |
|---|---|---|---|
| 4,434,364 A | 2/1984 | Correa et al. | |
| 4,525,818 A | 6/1985 | Cielo et al. | |
| 4,897,821 A | 1/1990 | Thierry et al. | |
| 4,995,101 A | 2/1991 | Titterton et al. | |
| 5,038,406 A | 8/1991 | Titterton et al. | |
| 5,047,990 A | 9/1991 | Gafos et al. | |
| 5,111,051 A | 5/1992 | Watanabe | |
| 5,142,400 A | 8/1992 | Solinsky | |
| 5,267,070 A | 11/1993 | Stewart et al. | |
| 5,301,167 A | 4/1994 | Proakis et al. | |
| 5,481,158 A | 1/1996 | Kato et al. | |
| 5,559,757 A | 9/1996 | Catipovic et al. | |
| 5,619,100 A | 4/1997 | Kyushima et al. | |
| 5,637,959 A | 6/1997 | Kyushima et al. | |
| 6,002,646 A | 12/1999 | Reid et al. | |
| 6,089,456 A | 7/2000 | Walsh et al. | |
| 6,580,541 B1 | 6/2003 | Yamashita et al. | |
| 6,603,124 B2 | 8/2003 | Maublant | |
| 6,625,083 B2 | 9/2003 | Vandenbroucke | |
| 7,016,260 B2 | 3/2006 | Bary | |
| 7,184,670 B2 | 2/2007 | Townsend et al. | |
| 7,223,962 B2 | 5/2007 | Fageraas et al. | |
| 7,261,162 B2 | 8/2007 | Deans et al. | |
| 7,298,672 B1 | 11/2007 | Tenghamn et al. | |
| 7,366,055 B2 | 4/2008 | Ronnekleiv et al. | |
| 7,417,924 B2 | 8/2008 | Vigen et al. | |
| 7,424,225 B1 | 9/2008 | Elliott | |
| 7,583,560 B2 * | 9/2009 | Chamberlain | G01V 1/22 367/50 |
| 7,621,229 B2 | 11/2009 | Bowen et al. | |
| 7,646,670 B2 | 1/2010 | Maxwell et al. | |
| 7,660,189 B2 | 2/2010 | Vigen et al. | |
| 7,660,192 B2 | 2/2010 | Paulsen | |
| 7,660,206 B2 | 2/2010 | Berg et al. | |
| 7,711,322 B2 | 5/2010 | Rhodes et al. | |
| 7,755,971 B2 | 7/2010 | Heatley et al. | |
| 7,796,466 B2 | 9/2010 | Combee et al. | |
| 7,826,794 B2 | 11/2010 | Rhodes et al. | |
| 7,835,221 B2 | 11/2010 | Vigen et al. | |
| 7,853,206 B2 | 12/2010 | Rhodes et al. | |
| 7,854,569 B1 | 12/2010 | Stenson et al. | |
| 7,859,944 B2 | 12/2010 | Zhou et al. | |
| 7,873,278 B2 | 1/2011 | Baiden | |
| 7,873,316 B2 | 1/2011 | Rhodes et al. | |
| 7,877,059 B2 | 1/2011 | Rhodes et al. | |
| 7,953,326 B2 | 5/2011 | Farr et al. | |
| 8,045,859 B2 | 10/2011 | Bandyopadhyay | |
| 8,045,919 B2 | 10/2011 | Rhodes et al. | |
| 8,050,881 B1 * | 11/2011 | Yeung | A61B 5/0024 370/503 |
| 8,055,193 B2 | 11/2011 | Rhodes et al. | |
| 8,115,620 B2 | 2/2012 | Breed | |
| 8,131,213 B2 | 3/2012 | Porter et al. | |
| 8,219,024 B2 | 7/2012 | Rhodes et al. | |
| 8,233,801 B2 | 7/2012 | Sexton et al. | |
| 8,279,714 B2 | 10/2012 | Paul et al. | |
| 8,295,708 B2 | 10/2012 | Bandyopadhyay | |
| 8,299,424 B2 | 10/2012 | Camilli | |
| 8,301,027 B2 | 10/2012 | Shaw et al. | |
| 8,305,227 B2 | 11/2012 | Jaffrey et al. | |
| 8,310,899 B2 | 11/2012 | Woodard et al. | |
| 8,315,560 B2 | 11/2012 | Rhodes et al. | |
| 8,326,219 B2 | 12/2012 | Rhodes et al. | |
| 8,326,220 B2 | 12/2012 | Rhodes et al. | |
| 8,331,856 B2 | 12/2012 | Rhodes et al. | |
| 8,335,469 B2 | 12/2012 | Rhodes et al. | |
| 8,340,526 B2 | 12/2012 | Camilli et al. | |
| 8,346,164 B2 | 1/2013 | Rhodes et al. | |
| 8,346,165 B2 | 1/2013 | Rhodes et al. | |
| 8,358,973 B2 | 1/2013 | Rhodes et al. | |
| 8,364,078 B2 | 1/2013 | Rhodes et al. | |
| 8,385,821 B2 | 2/2013 | Rhodes et al. | |
| 8,417,183 B2 | 4/2013 | Rhodes et al. | |
| 8,440,958 B2 | 5/2013 | Bandyopadhyay | |
| 8,457,498 B2 | 6/2013 | Stewart | |
| 8,515,343 B2 | 8/2013 | Rhodes et al. | |
| 8,515,344 B2 | 8/2013 | Rhodes et al. | |
| 8,547,036 B2 | 10/2013 | Tran | |
| 8,611,181 B2 | 12/2013 | Woodward et al. | |
| 8,670,293 B2 | 3/2014 | Morozov | |
| 8,682,244 B2 | 3/2014 | Rhodes et al. | |
| 8,750,707 B2 | 6/2014 | Sabet et al. | |
| 8,774,638 B2 | 7/2014 | Duligall et al. | |
| 8,813,669 B2 | 8/2014 | Race et al. | |
| 8,867,315 B2 | 10/2014 | Paul et al. | |
| 8,953,911 B1 | 2/2015 | Xu et al. | |
| 8,953,944 B2 | 2/2015 | Machado et al. | |
| 9,031,413 B2 | 5/2015 | Doniec et al. | |
| 9,037,079 B2 | 5/2015 | Wolfe et al. | |
| 9,086,325 B2 | 7/2015 | Nash et al. | |
| 9,154,234 B2 | 10/2015 | Motley | |
| 9,192,030 B2 | 11/2015 | Tran | |
| 9,203,342 B2 | 12/2015 | Rongve et al. | |
| 9,203,524 B2 | 12/2015 | Simpson et al. | |
| 9,231,708 B2 | 1/2016 | Farr et al. | |
| 9,294,201 B2 | 3/2016 | Farr et al. | |
| 9,490,910 B2 | 11/2016 | Lacovara | |
| 9,490,911 B2 | 11/2016 | Hopewell et al. | |
| 9,825,713 B2 | 11/2017 | Hopewell et al. | |
| 10,263,711 B2 | 4/2019 | Lacovara | |
| 2002/0110048 A1 | 8/2002 | Vandenbroucke | |
| 2002/0179364 A1 | 12/2002 | Bussear et al. | |
| 2003/0036351 A1 | 2/2003 | Forbes | |
| 2003/0111611 A1 | 6/2003 | Maublant | |
| 2003/0117893 A1 | 6/2003 | Bary | |
| 2004/0016867 A1 | 1/2004 | Milshtein et al. | |
| 2004/0208514 A1 | 10/2004 | Zhang et al. | |
| 2005/0088916 A1 | 4/2005 | Zhu et al. | |
| 2005/0232634 A1 | 10/2005 | Evangelides et al. | |
| 2005/0232638 A1 | 10/2005 | Fucile et al. | |
| 2006/0001428 A1 | 1/2006 | Milne et al. | |
| 2006/0008275 A1 | 1/2006 | Lacovara et al. | |
| 2006/0062099 A1 | 3/2006 | Yazaki et al. | |
| 2006/0159524 A1 | 7/2006 | Thompson et al. | |
| 2006/0286931 A1 | 12/2006 | Rhodes et al. | |
| 2007/0183782 A1 | 8/2007 | Farr et al. | |
| 2008/0080318 A1 | 4/2008 | Maxwell et al. | |
| 2008/0129510 A1 | 6/2008 | Tuttle | |
| 2008/0144442 A1 | 6/2008 | Combee et al. | |
| 2008/0205892 A1 | 8/2008 | Baiden | |
| 2009/0045741 A1 | 2/2009 | Kyushima et al. | |
| 2009/0067289 A1 | 3/2009 | Lee et al. | |
| 2009/0074422 A1 | 3/2009 | Stewart | |
| 2009/0080290 A1 | 3/2009 | Ray et al. | |
| 2009/0208219 A1 | 8/2009 | Rhodes et al. | |
| 2009/0214224 A1 | 8/2009 | Cho et al. | |
| 2009/0274465 A1 | 11/2009 | Bandyopadhyay | |
| 2009/0279384 A1 | 11/2009 | Pavel | |
| 2010/0008666 A1 | 1/2010 | Kovsh et al. | |
| 2010/0014618 A1 | 1/2010 | Tsukio et al. | |
| 2010/0133443 A1 | 6/2010 | Ohtani | |
| 2010/0212574 A1 | 8/2010 | Hawkes et al. | |
| 2010/0227551 A1 | 9/2010 | Volanthen et al. | |
| 2010/0227552 A1 | 9/2010 | Volanthen et al. | |
| 2011/0005801 A1 | 1/2011 | Olivier et al. | |
| 2011/0058814 A1 | 3/2011 | Camilli et al. | |
| 2011/0076940 A1 | 3/2011 | Rhodes et al. | |
| 2011/0222374 A1 | 9/2011 | Berg et al. | |

(56) References Cited

U.S. PATENT DOCUMENTS

| | | |
|---|---|---|
| 2011/0229141 A1 | 9/2011 | Chave et al. |
| 2011/0300008 A1 | 12/2011 | Fielder et al. |
| 2011/0300794 A1 | 12/2011 | Rhodes et al. |
| 2012/0017989 A1 | 1/2012 | Chang et al. |
| 2012/0069702 A1 | 3/2012 | Muyzert et al. |
| 2012/0099399 A1 | 4/2012 | Lichter et al. |
| 2012/0105246 A1 | 5/2012 | Sexton et al. |
| 2012/0170935 A1 | 7/2012 | Machado et al. |
| 2012/0177367 A1 | 7/2012 | Miller |
| 2012/0263476 A1 | 10/2012 | Sabet et al. |
| 2012/0325919 A1 | 12/2012 | Warren et al. |
| 2013/0010612 A1 | 1/2013 | Lee et al. |
| 2013/0083622 A1 | 4/2013 | Herrmann et al. |
| 2013/0187787 A1 | 7/2013 | Damus et al. |
| 2013/0195465 A1 | 8/2013 | Rhodes et al. |
| 2013/0271088 A1 | 10/2013 | Hwang et al. |
| 2013/0279299 A1 | 10/2013 | Rhodes et al. |
| 2013/0315265 A1* | 11/2013 | Webb, III ............ H04J 3/0635 370/516 |
| 2013/0330083 A1 | 12/2013 | Song et al. |
| 2014/0003199 A1* | 1/2014 | Dougan ................ G04G 7/00 368/46 |
| 2014/0051352 A1 | 2/2014 | Wolfe et al. |
| 2014/0086008 A1* | 3/2014 | Pharris ................. G01V 1/26 367/21 |
| 2014/0161466 A1 | 6/2014 | Riza |
| 2014/0198607 A1* | 7/2014 | Etienne ............... G01V 1/3852 367/15 |
| 2014/0212142 A1 | 7/2014 | Doniec et al. |
| 2014/0254315 A1 | 9/2014 | Rigsby et al. |
| 2014/0254649 A1 | 9/2014 | Afkhami et al. |
| 2014/0301161 A1 | 10/2014 | Brizard et al. |
| 2014/0341584 A1 | 11/2014 | Hopewell et al. |
| 2014/0363166 A1 | 12/2014 | Lacovara |
| 2015/0000582 A1 | 1/2015 | Lelaurin et al. |
| 2015/0132004 A1 | 5/2015 | Farr et al. |
| 2015/0188695 A1 | 7/2015 | Crowell |
| 2015/0219790 A1 | 8/2015 | Gateman et al. |
| 2015/0372769 A1 | 12/2015 | Farr et al. |
| 2016/0041280 A1* | 2/2016 | Naes ..................... G01V 1/18 367/149 |
| 2016/0094298 A1* | 3/2016 | Isfeldt .................. G01V 1/226 398/104 |
| 2016/0121009 A1 | 5/2016 | Farr et al. |
| 2016/0124105 A1 | 5/2016 | Valsvik et al. |
| 2016/0127042 A1 | 5/2016 | Farr et al. |
| 2016/0170060 A1 | 6/2016 | Hopewell et al. |
| 2016/0349387 A1* | 12/2016 | Rokkan ................ G01V 1/166 |
| 2017/0114635 A1 | 4/2017 | Kyle et al. |
| 2017/0168177 A1 | 6/2017 | Wang et al. |
| 2017/0237458 A1 | 8/2017 | Vanduyn et al. |

FOREIGN PATENT DOCUMENTS

| | | |
|---|---|---|
| CN | 101365964 A | 2/2009 |
| CN | 102098112 | 6/2011 |
| CN | 102565870 A | 7/2012 |
| CN | 102916744 | 2/2013 |
| CN | 103095380 | 5/2013 |
| CN | 104038292 | 9/2014 |
| CN | 204103926 | 1/2015 |
| CN | 104618032 | 5/2015 |
| EP | 1 891 457 | 2/2008 |
| EP | 1 891 762 | 2/2008 |
| EP | 2 341 644 | 7/2011 |
| EP | 2 362 559 | 8/2011 |
| EP | 2 657 723 | 10/2013 |
| EP | 2 866 051 | 4/2015 |
| EP | 2 913 942 | 9/2015 |
| GB | 2 511 938 | 7/2016 |
| JP | 6139640 | 2/1986 |
| RU | 2431868 C1 | 10/2011 |
| RU | 2539745 C1 | 1/2015 |
| WO | WO-2005/074426 A1 | 8/2005 |
| WO | WO-2009/039488 A1 | 3/2009 |
| WO | WO-2010/021810 | 2/2010 |
| WO | WO-2010/076646 A1 | 7/2010 |
| WO | WO-2011/139159 | 11/2011 |
| WO | WO-2012/123698 | 9/2012 |
| WO | WO-2013/160475 | 10/2013 |

OTHER PUBLICATIONS

Akyildiz, Ian F., "Challenges for Efficient Communication in Underwater Acoustic Sensor Networks", ACM Sigbed Review 1.2 (2004), pp. 3-8.
Ambalux Corporation Company Information, 2010.
Arnon, S. et al., "Non-line-of-sight underwater optical wireless communication network", J. Opt. Soc. Am. A, 26.3 (2009), pp. 530-539.
Bajwa, Navneet et al., "Smart Transmitters and Receivers for Underwater Free-Space Optical Communication—A Review," International Conference on Communications, Computing & Systems, 2014.
Brundage, Heather, "Designing a Wireless Underwater Optical Communication System," Feb. 2010.
CN First Office Action for CN Patent Application No. 201480021465. 3, dated Dec. 29, 2016.
Cox Jr., William C., "A 1 Mpbs Underwater Communication System Using a 405 nm Laser Diode and Photomultiplier Tube," 2007.
David Wilson, Woods Hole researchers develop sub-sea comms system, pp. 1-2, Jul. 12, 2010, The Engineer.co.uk.
Destrez et al., "Underwater High Bit-Rate Optical Free-Space Communication System," International Workshop on Optical Wireless Communications (IWOW), 2012.
Drakeley, B. et al., "Permanent ocean bottom seismic systems to improve reservoir management", Offshore 63.1, Jan. 2003, 4 pages.
European Extended Search Report for EP 14798429.8 dated Aug. 10, 2016.
Examination Report for application No. 14 798 429.8-1220 dated May 2, 2018.
Examination Report for AU 2014265955 dated Mar. 16, 2017.
Examination Report for AU 2017261530 dated Jan. 2, 2019.
Fairfield Nodal—Permanent Monitoring Presentation, Nov. 27, 2012.
Farr, N. et al. "Optical Modem Technology for Seafloor Observatories" pp. 6.
Final Office Action on U.S. Appl. No. 15/664,697 dated Mar. 29, 2018.
First Office Action for application No. MX/a/2015/013171 dated Mar. 17, 2017.
Gabriel, Chadi et al., "Journal of Optical Communications and Networking," Archimer, vol. 5, Issue 1, Jan. 2013.
Gabriel, Chadi et al., "Optical Communication System for an Underwater Wireless Sensor Network," EGU General Assembly, Apr. 2012.
Gabriel, Chadi, et al., "Channel Modeling for Underwater Optical Communication," IEEE Global Communications Conference, Dec. 2011.
Garcia-Hernandez, C. F. et al., "Wireless Sensor Networks and Applications: A Survey", IJCSNS International Journal of Computer Science and Network Security,7.3, (2007), p. 264-273.
Giles, John W., "Underwater Optical Communication Systems: Part 2: Basic Design Consideration," IEEEE Military Communications Conference, 2005.
Grattan et al., Optical Fiber Sensor Technology: Fundamentals, 2000, Springer Science Business Media, p. 287.
Hammock,D, "Multiple-anode PMT behaves like many detectors in one," May 1, 2001,(7 pages) Laser Focus World.
Hanson, Frank, et al., "High Bandwidth Underwater Optical Communication," Applied Optics, vol. 47, No. 2, Jan. 10, 2008.
High Data Rate Underwater Laser Communications, Longacre et al., 1302 Ocean Optics X, SPIE, 1990 (14 pages).
International Search Report and Written Opinion for PCT/US2017/ 038166 dated Dec. 13, 2018.

(56) References Cited

OTHER PUBLICATIONS

International Search Report and Written Opinion in International Application No. PCT/US2014/024392 dated Nov. 25, 2014 (8 pages).
Mexican First Office Action for application No. MX/a/2017/011038 dated Oct. 9, 2018.
Minev, P. et al, Short-Range Optical OFDM, Newcastle University School of Electrical and Electronic Engineering, 2012, 5 pages.
N.Farr, A. Bowen,J. et al. "An Integrated, Underwater Optical/Acoustic Communications System" 6 Pages.
Non-Final Office Action in U.S. Appl. No. 13/843,942 dated Oct. 15, 2014 (32 pages).
Non-Final Office Action on U.S. Appl. No. 15/625,722 dated Sep. 18, 2018.
Non-Final Office Action on U.S. Appl. No. 15/625,730 dated Sep. 21, 2018.
Notice of Allowance on U.S. Appl. No. 13/843,942 dated Aug. 17, 2016.
Notice of Allowance on U.S. Appl. No. 14/203,550 dated Sep. 16, 2016.
Notice of Allowance on U.S. Appl. No. 15/081,627 dated Aug. 28, 2017.
Notice of Allowance on U.S. Appl. No. 15/081,627 dated Sep. 14, 2017.
Notice of Allowance on U.S. Appl. No. 15/081,627 dated Jan. 3, 2018.
Notice of Allowance on U.S. Appl. No. 15/081,627 dated May 7, 2018.
Notice of Allowance on U.S. Appl. No. 15/081,627 dated Aug. 8, 2018.
Notice of Allowance on U.S. Appl. No. 15/237,106 dated Sep. 12, 2017.
Notice of Allowance on U.S. Appl. No. 15/334,486 dated Feb. 14, 2019.
Notice of Allowance on U.S. Appl. No. 15/625,722 dated Mar. 15, 2019.
Notice of Allowance on U.S. Appl. No. 15/625,730 dated Jan. 24, 2019.
Notice of Allowance on U.S. Appl. No. 15/625,730 dated May 8, 2019.
Notice of Allowance on U.S. Appl. No. 15/664,707 dated Oct. 3, 2018.
Notice of Allowance on U.S. Appl. No. 15/664,697 dated Dec. 18, 2018.
Notice of Allowance on U.S. Appl. No. 15/664,707 dated Mar. 5, 2019.
Office Action on U.S. Appl. No. 15/237,106 dated Jun. 15, 2017.
Office Action on U.S. Appl. No. 15/334,486 dated Aug. 24, 2017.
Office Action on U.S. Appl. No. 15/334,486 dated Apr. 3, 2018.
Office Action on U.S. Appl. No. 15/334,486 dated Oct. 22, 2018.
Office Action on U.S. Appl. No. 15/664,697 dated Sep. 20, 2017.
Office Action on U.S. Appl. No. 15/664,697 dated Mar. 29, 2018.
Optical system promises to revolutionize undersea communications, pp. 1-3, Feb. 23, 2010, Woods Hole Oceanographic Institution News Release.
Russian Office Action and Search Report and English translation issued in application No. 2015141623/07(064280) dated Oct. 13, 2016.
Russian Office Action for RU Patent Application No. 2017121984, dated Dec. 18, 2018.
Sackinger, E., Broadband Circuit for Optical Fiber Communication, Wiley-Interscience, 2005, 46 pages.
Simpson et al., "Smart Transmitters and Receivers for Underwater Free-Space Optical Communication," IEEE Journal on Selected Areas in Communications, vol. 30, No. 5, Jun. 2012.
Simpson et al., Smart Transmitters and Receivers for Underwater Free-Space Optical Communication, 2012, IEEE, pp. 964-974.
Simpson et al., Smart Transmitters and Receivers for Underwater Free-Space Optical Communication, 2012, pp. 964-974, IEEE.
Simpson, J., Smart Transmitters and Receivers for Underwater Free-Space Optical Communication, IEEE Journal on Selected Areas in Communication, vol. 30, No. 5, Jun. 2012, 11 pages.
Simpson, Jim A. "Underwater Free-Space Optical Communication Using Smart Transmitters and Receivers" pp. 154.
Simpson, Jim A. "Underwater Free-Space Optical Communication Using Smart Transmitters and Receivers," 2012.
Simpson, Jim A. "Underwater Free-Space Optical Communication Using Smart Transmitters and Receivers," v.2 2012.
Smart, Jeffrey H., "Underwater Optical Communications Systems: Part 1: Variability of Water Optical Parameters," IEEEE Military Communications Conference, 2005.
Song et al., Investigation of Geometrical Effects of Antireflective Subwavelength Grating Structures for Optical Device Applications, 2010, Springer Science Business Media, LLC, pp. 771-777.
Sta-rite Swimquip Brand Underwater Pool Lights and Niches for 12 and 120 Volt Light Fixtures Owners Manual, 2003.
Technip Metro logy Report, Field Report No. CG-TUKOOOI-FS-FR-269, Jun. 26, 2016, http://eprints2.insa-strasbourg.fr/2564/2/2016_Wilhelm_Lau re_Annexes_PFE_Topographie.pdf.
U.S. Notice of Allowance dated Sep. 24, 2015 for U.S. Appl. No. 14/203,550.
U.S. Notice of Allowance on U.S. Appl. No. 13/843,942 dated Sep. 20, 2016.
U.S. Notice of Allowance on U.S. Appl. No. 14/203,550 dated Jun. 29, 2016.
U.S. Office Action dated Feb. 2, 2016 for U.S. Appl. No. 14/203,550.
U.S. Office Action dated Oct. 15, 2014.
U.S. Office Action on U.S. Appl. No. 14/203,550 dated Jun. 18, 2015.
U.S. Office Action on U.S. Appl. No. 13/843,942 dated Dec. 15, 2015.
U.S. Office Action on U.S. Appl. No. 13/843,942 dated Jun. 26, 2015.
U.S. Office Action on U.S. Appl. No. 13/843,942 dated Jun. 2, 2016.
U.S. Office Action on U.S. Appl. No. 14/203,550 dated Feb. 2, 2016.
U.S. Office Action on U.S. Appl. No. 15/081,627 dated Mar. 17, 2017.
U.S. Office Action on U.S. Appl. No. 15/334,486 dated Jan. 19, 2017.
U.S. Office Action on U.S. Appl. No. 15/664,707 dated May 2, 2018.
U.S. Office Action on U.S. Appl. No. 15/664,697 dated Sep. 21, 2018.
U.S. Office Action on U.S. Appl. No. 15/664,707 dated Jul. 5, 2018.
Vasilescu et al., Data Collection Storage and Retrieval with an Underwater Sensor Network, pp. 154-165, SenSys'05, Nov. 2-4, 2005, San Diego, California, USA.
Wilson, David, Woods Hole Researchers Develop Sub-Sea Comms Systems, 2010.
Yoon, S., et al. "AURP: An AUV-Aided Underwater Routing Protocol for Underwater Acoustic Sensor Networks" Sensors 12.2 (2012), pp. 1827-1845.
Corrected Notice of Allowability on U.S. Appl. No. 15/081,627 dated Sep. 14, 2017 (2 pages).
Farr et al., "Demonstration of Wireless Data Harvesting from a Subsea Node Using a 'Ship of Opportunity'", Woods Hole Oceanographic Institute (5 pages).
Farr et al., "Final Technical Report: Optical Data Transmission in a Turbid Environment", Woods Hole Oceanographic Institute, Jun. 23, 2014 (6 pages).
International Preliminary Report on Patentability and Written Opinion of the International Searching Authority dated Jan. 1, 2019 (8 pages).
Minev et al., "Short Range Optical OFDM", IEEE, 2011, Newcastle University, Newcastle Upon Tyne, UK (5 pages).
Non-Final Office Action on U.S. Appl. No. 16/405,710 dated Jun. 13, 2019 (23 pages).
Notice of Allowance on U.S. Appl. No. 15/625,722 dated Sep. 11, 2019 (5 pages).
Notice of Allowance on U.S. Appl. No. 16/405,710 dated Sep. 17, 2019 (10 pages).

(56) References Cited

OTHER PUBLICATIONS

Preliminary Report on Patentability for PCT/US2014/024392 dated Sep. 24, 2015 (7 pages).
Third Party Observations on PCT/US2014/024392 dated Apr. 1, 2016 (4 pages).
Corrected Notice of Allowance on U.S. Appl. No. 15/625,722 dated Jul. 23, 2019 (2 pages).
Jawhar et al., "An Efficient Framework for Autonomous Underwater Vehicle Extended Sensor Networks for Pipeline Monitoring", IEEE International Symposium on Robotic and Sensors Environments, 2013, pp. 1-6, Washington DC, USA (6 pages).
Notice of Allowance on U.S. Appl. No. 15/625,722 dated Jul. 17, 2019 (5 pages).
Pontbriand et al., "Wireless Data Harvesting Using the AUV Sentry and WHOI Optical Modem", Woods Hole Oceanographic Institution, 2015 (6 pages).
Notice of Allowance for U.S. Appl. No. 15/625,730 dated Oct. 18, 2019 (5 pages).
Notice of Allowance for U.S. Appl. No. 15/625,730 dated Feb. 20, 2020 (5 pages).
Notice of Allowance for U.S. Appl. No. 16/405,710 dated Nov. 27, 2019 (2 pages).

* cited by examiner

SEISMIC SURVEYS WITH OPTICAL COMMUNICATION LINKS

CROSS-REFERENCES TO RELATED APPLICATIONS

This application claims the benefit of priority under 35 U.S.C. § 119 to U.S. Provisional Patent Application No. 62/357,118, filed Jun. 30, 2016, U.S. Provisional Patent Application No. 62/357,145, filed Jun. 30, 2016, and U.S. Provisional Patent Application No. 62/357,136, filed Jun. 30, 2016, each of which are hereby incorporated by reference herein in their entirety.

BACKGROUND

A seismic data acquisition system can acquire seismic data relating to subsurface features, such as lithological formations or fluid layers that may indicate the presence of hydrocarbons, minerals or other elements. An acoustic signal can penetrate the surface of the earth. The acoustic signal can reflect or refract off of subsurface lithological formations. The reflected or refracted acoustic signals can be acquired, analyzed, and interpreted to indicate physical characteristics of, for example, the lithological formations such as the presence of hydrocarbons.

SUMMARY

At least one aspect is directed to a system to perform a seismic survey in a marine environment. The system can include a seismic data acquisition unit and an extraction vehicle. The seismic data acquisition unit can be placed or disposed on a seabed in the marine environment. The seismic data acquisition unit can include a first clock. The extraction vehicle can establish an optical communications link with the seismic data acquisition unit. The extraction vehicle can include a second clock and a data processing system. The data processing system can syntonize or synchronize the first clock of the seismic data acquisition unit to the second clock. The data processing system can syntonize the frequency of the first clock to the second clock via the optical communications link. The data processing system can synchronize the time of the first clock to the second clock via the optical communications link. The data processing system can instruct the seismic data acquisition unit to enter a low power state subsequent to syntonization or synchronization of the first clock. The seismic data acquisition unit can be configured to exit the low power state and acquire seismic data in an operational state.

At least one aspect can be directed to a method of performing a seismic survey in a marine environment. The method can include positioning a seismic data acquisition unit on a seabed in the marine environment. The seismic data acquisition unit can include a first clock. The method can include an extraction vehicle establishing an optical communications link with the seismic data acquisition unit. The extraction vehicle can include a second clock and a data processing system. The method can include the data processing system syntonizing or synchronizing, via the optical communications link, the first clock of the seismic data acquisition unit to correspond to the second clock. The method can include the data processing system instructing the seismic data acquisition unit to enter a low power state subsequent to syntonization or synchronization of the first clock. The seismic data acquisition unit can be configured to exit the low power state and acquire seismic data in an operational state.

At least one aspect is directed to a system to perform a seismic survey. The system can include a seismic data acquisition unit. The system can include a seismic data acquisition unit having a transmitter window. The transmitter window can be disposed in a first aperture of a lid of the seismic data acquisition unit. The seismic data acquisition unit can include a receiver window disposed in a second aperture of the lid. The system can include a first gasket positioned between the transmitter window and the first aperture. The first gasket can provide a clearance greater than a threshold between the transmitter window and the first aperture. The clearance can be greater than a threshold to allow the transmitter window to deform or move. For example, by allowing the transmitter window to deform, move, expand or contract under pressure, the first gasket between the transmitter window and the first aperture can reduce impingement and cracking of the transmitter window. The system can further include a second gasket positioned between the receiver window and the second aperture. The second gasket between the receiver window and the second aperture can provide a clearance greater than the threshold. By configuring the second gasket between the receiver window and the second aperture to provide the clearance greater than the threshold, the second gasket can allow the receiver window to move, deform, expand, or contract. For example, by allowing the receiver window to move under pressure, the second gasket between the receiver window and the second aperture can reduce impingement and cracking of the receiver window. The transmitter window, the receiver window, or both the transmitter window and the receiver windows can be configured to pass at least one of optical and electromagnetic communications to or from an extraction vehicle via at least one of a transmitter window and a receiver window of the extraction vehicle.

At least one aspect is directed to a method of performing a seismic survey. The method can include providing a seismic data acquisition unit. The seismic data acquisition unit can include a transmitter window disposed in a first aperture of a lid, and a receiver window disposed in a second aperture of the lid. The method can include providing a first gasket between the transmitter window and the first aperture. The first gasket between the transmitter window and the first aperture can provide a clearance greater than a threshold to allow the transmitter window to move under pressure to reduce impingement and cracking of the transmitter window. The method can include providing a second gasket between the receiver window and the second aperture. The second gasket between the receiver window and the second aperture can provide clearance greater than the threshold. The clearance provided by the second gasket between the receiver window and the second aperture can allow the receiver window to move under pressure to reduce impingement and cracking of the receiver window. The method can include passing, via at least one of the transmitter window and the receiver window of the seismic data acquisition unit, optical or electromagnetic communications to or from an extraction vehicle via at least one of a transmitter window and a receiver window of the extraction vehicle.

At least one aspect is directed to a system to perform a seismic survey in a marine environment. The system can include a seismic data acquisition unit disposed on a seabed in the marine environment. The seismic data acquisition unit can include a local pressure sensor, an optical transmitter and an optical receiver to determine one or more pressure values. The system can include an extraction vehicle including a reference pressure sensor, an optical transmitter, and an optical receiver to establish an optical communications link with the seismic data acquisition unit. The extraction vehicle can generate reference pressure data. The local pressure sensor or the one or more pressure values can be calibrated based on the reference pressure data generated by the extraction vehicle.

At least one aspect is directed to a method of performing a seismic survey in a marine environment. The method can include deploying a seismic data acquisition unit on a seabed in the marine environment. The seismic data acquisition unit can include a local pressure sensor, an optical transmitter and an optical receiver. The method can include an extraction vehicle establishing an optical communications link with the seismic data acquisition unit. The extraction vehicle can include a reference pressure sensor, an optical transmitter, and an optical receiver. The method can include the extraction vehicle providing, to the seismic data acquisition unit via the optical communication link, reference pressure data. The method can include calibrating, by one or more processors based on the reference pressure data, the local pressure sensor or one or more pressure values measured by the local pressure sensor.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
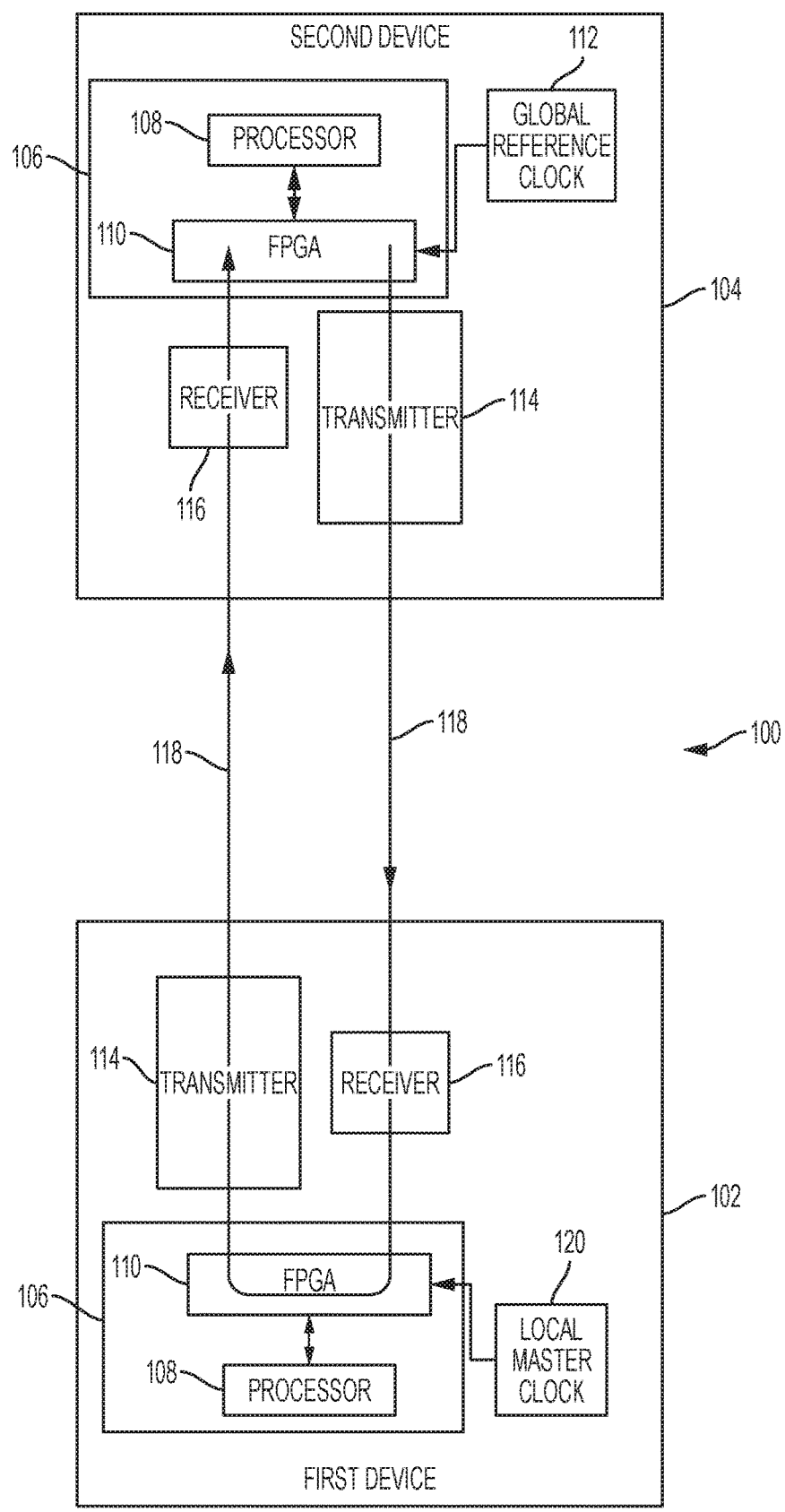
FIG. 1 is a block diagram depicting an optical link timing and frequency synchronization and syntonization system, according to an illustrative implementation.

Following below are more detailed descriptions of various concepts related to, and implementations of, methods, apparatuses, and systems of timing control and management of free space optical links (or other electromagnetic signals including optical and acoustic signals) to or from seismic data acquisition units. The optical links, for example, can transmit timing data or other data to or from seismic data acquisition units that are deployed on a seabed or other surface of the earth. The timing data can synchronize the seismic data acquisition units so that extracted seismic data can be properly interpreted to indicate the presence of absence of subsurface formations. The various concepts introduced above and discussed in greater detail below may be implemented in any of numerous ways, as the described concepts are not limited to any particular manner of implementation.

In a sub-marine seismic data acquisition system a series of seismic data acquisition units (e.g., nodes) can be deployed on a seabed or lakebed. An acoustic signal can be propagated from a source through the water column and can pass the seabed and enter (e.g., "down") into the earth. The acoustic signal can reflect or refract off of various lithological formations back (e.g., "up") toward the surface of the earth. The seismic data acquisition units deployed on the seabed can acquire the reflected or refracted acoustic signals.

An extraction vehicle, such as an autonomous or remote underwater vehicle, or other entity such as a vessel on the surface of the body of water can wirelessly or optically communicate with the seismic data acquisition units deployed on a seabed or other surface of the earth to extract the acquired seismic data. The systems and methods described herein relate to techniques used over the optical link to control and manage data acquisition timing to ensure proper functioning of the seismic data acquisition units. For example, there can be hundreds or thousands of seismic data acquisition units positioned on a seabed, in a symmetrical array pattern, other pattern, or random deployment. Timing control and management of the seismic data acquired by the individual seismic data acquisition units is needed to generate useable or quality seismic data. For example, if the seismic data acquisition units are not properly synchronized timing errors may be present in the acquired seismic data, which can complicate or prevent proper interpretation of the data.

Recording sensors of autonomous or individual seismic data acquisition units that acquire seismic data are susceptible to timing shifts relative to one another. These timing errors may require correction, subsequent to data collection, in order to improve the analysis of the collected seismic data. The systems and methods described herein can control and minimize the sources of timing errors to providing control systems for syntonization and synchronization of the local clocks of the individual seismic data acquisition units deployed as part of a seismic survey. To achieve this control, the systems and methods provided herein can provide reference signals to each deployed seismic data acquisition unit through optical communication links. The systems and methods provided herein can use a free space optical communications link, or any electromagnetic transmission system (e.g., optical or acoustic) with the appropriate bandwidth for other data communication.

In some cases, the systems and methods described herein relate to techniques used over the optical link to control and manage pressure data or pressure measurements of the seismic data acquisition units. For example, the systems and methods described herein can control and adjust pressure sensor data sensed by or for seismic data acquisition units deployed on a seabed or other location as part of a seismic survey. To achieve this control, the systems and methods provided herein can transmit or receive pressure sensor data or other reference signals to each deployed seismic data acquisition unit through optical communication links. The systems and methods provided herein can use a free space optical communications link, or any electromagnetic transmission system (e.g., optical or acoustic) with the appropriate bandwidth for seismic data communication.

An extraction vehicle, such as an autonomous or remote underwater vehicle, or other entity such as a vessel on the surface of the body of water can wirelessly or optically communicate with the seismic data acquisition units deployed on a seabed or other surface of the earth to extract the acquired seismic data. The systems and methods described herein can relate to one or more windows built into seismic data acquisition units that acquire seismic data, as well as windows built into extraction vehicle. The seismic data acquisition units and the extraction vehicles can communicate with each other optically (or using another electromagnetic means). The optical (or other transmissions) can pass through the windows of the respective devices. For example, there can be hundreds or thousands of seismic data acquisition units positioned on a seabed, in a symmetrical array pattern, other pattern, or random deployment. One or more submersible extraction vehicles can pass within range (e.g., 10 meters or some other distance) of the individual seismic data acquisition units and can establish an optical (or other type of) communication link with one of the seismic data acquisition units. Data, such as seismic data, frequency calibration data, clock synchronization data, power state data, or other information can be passed between the extraction vehicle and the optically linked seismic data acquisition unit. The data transmissions can pass through at least one window of the seismic data acquisition unit and through at least one window of the extraction vehicle. The window enables passage of the optical data transmission, for example to or from transmitters, receivers, or other electronic or mechanical components disposed within the devices.

FIG. 1 is a block diagram depicting an optical link timing and frequency synchronization and syntonization system. The system 100 can perform a seismic survey in a marine environment. The system 100 can facilitate performing the seismic survey in the marine environment. The system 100 can be used to perform at least a part of the seismic survey in the marine environment. For example, the system 100 can synchronize or syntonize one or more components of a first device 102. The system 100 can communicate, provide or obtain seismic data, sensor data, status data, quality information, or other information.

The system 100 can include a first device 102 and a second device 104. The first device 102 can include a transmitter 114, receiver 116, data processing system 106, and local master clock 120. The data processing system 106 can include a field programmable gate array ("FPGA") 110 and a processor 108 and memory. The second device 104 can include a transmitter 114, receiver 116, data processing system 106, and global reference clock 112. The data processing system 106 of the second device 104 can include a field programmable gate array ("FPGA") 110 and a processor 108 and memory.

The first device 102 can include or refer to a seismic data acquisition unit, ocean bottom sensor, self-contained ocean bottom sensor, node, or other unit that facilitates performing a seismic survey. The first device 102 can include a geophone contained within the first device, or externally connected to the first device 102. The first device can be placed on a seabed in the marine environment.

Figure 6:
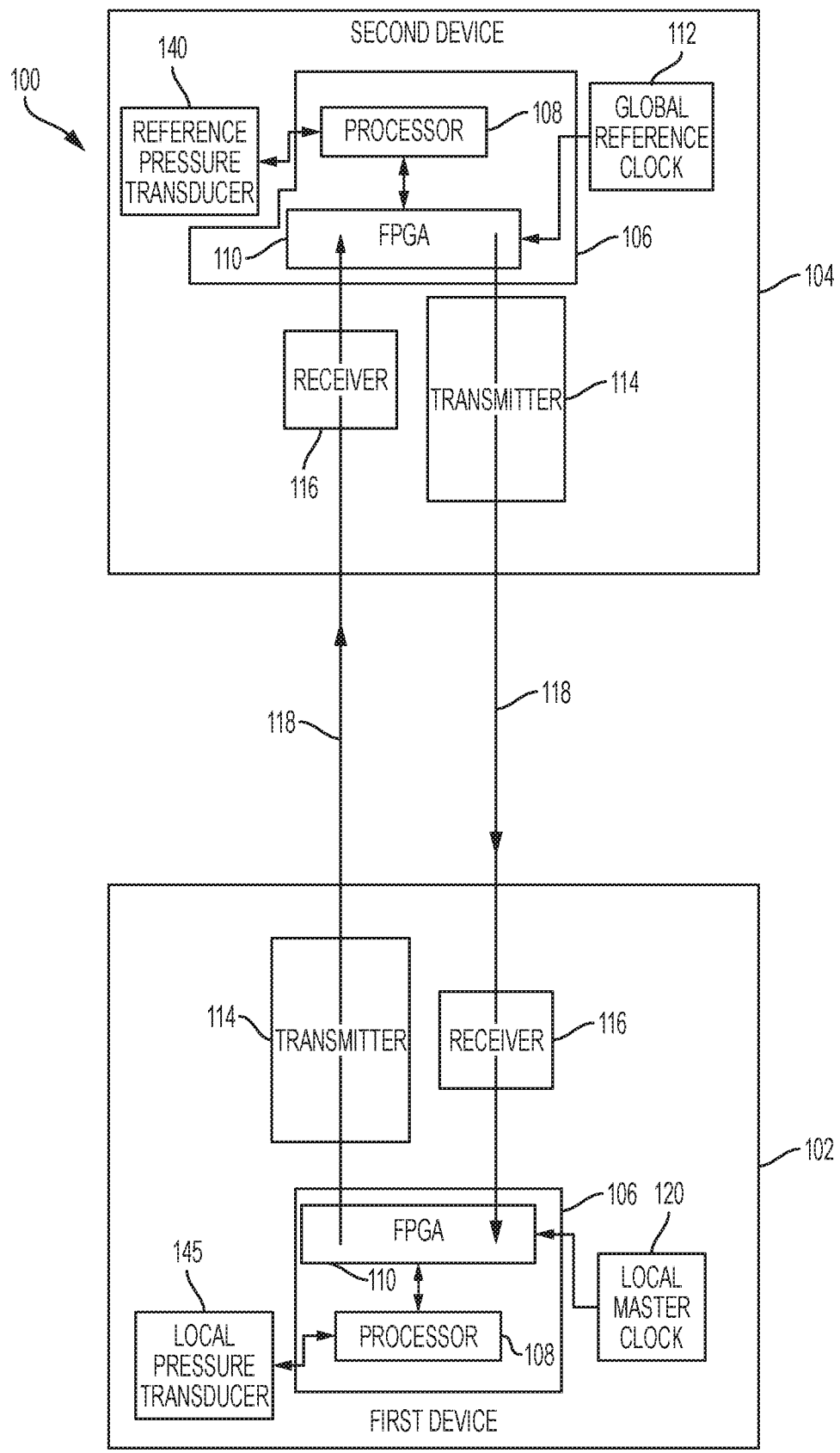
FIG. 6 is a block diagram depicting a system for calibrating a sensor via an optical link, according to an illustrative implementation.

The system 100 can include a second device 104. The second device 104 can include or be referred to as an extraction vehicle, remotely operated vehicle, underwater vehicle, autonomous underwater vehicle, or other device that facilitates performing a seismic survey can interact with the first device 102. The second device 104 can communicate with the first device 102 to establish an optical communications link 118 with the first device 102. The second device 104 can establish the optical communications link 118 with the first device 102, or the first device 102 can establish the optical communications link 118 with the second device 104. As illustrated in FIG. 1, the communications link 118 can form a loop around which a signal can travel. However, the communications link 118 illustrated in FIG. 6 is configured such that two-way signals travel back and forth between the first and second devices 102 and 104, respectively.

Establishing the optical communications link 118 can include a receiver 116 of the second device 104 successfully receiving information from a transmitter 114 of the first device 102, and the receiver 116 of the first device 102 successfully receiving information from the transmitter 114 of the second device 104. Establishing the optical communications link 118 can refer to completing a handshaking process in which data optically transmitted and received between the first device 102 and the second device 104 is verified. In some cases, the first device 102 or the second device 104 can adjust a gain of the receiver or a power level of the transmitter until data is successfully received over the optical communications link 118. Receipt of information can include receiving data, data packets, header information, payload data, bits, bytes, or signals. Successful receipt of information can refer to receiving data or a data stream with a satisfactory bit error rate at a satisfactory data rate. The bit error rate can be satisfactory based on a comparison with a bit error rate threshold. The bit error rate can be satisfactory if it is less than or equal to a threshold, such as 0.5, 0.4, 0.3, 0.2, 0.1, or some other threshold that facilitates performing a seismic survey. The data rate can be, for example, 100 kilobytes per second, 200 kilobytes per second, 500 kilobytes per second, 700 kilobytes per second, 1 megabyte per second, 1.5 megabytes per second, 5 megabytes per second, 10 megabytes per second, 20 megabytes per seconds, 30 megabytes per second, 50 megabytes per second, 100 megabytes per second or more.

The second device 104 can syntonize or synchronize, via the optical communications link 118, a frequency of the first clock 120 (e.g., local master clock) of the seismic data acquisition unit 102 to correspond to the second clock 112 (e.g., global reference clock). The system 100 can syntonize, synchronize, calibrate, tune or otherwise adjust the first clock 120 or other sensor, component or logic device of the first device 102.

Syntonizing can refer to correcting a frequency error of the local master clock 120. Syntonizing can refer to adjusting the frequency of oscillation of the local master clock 120 or an offset of the oscillation, such as a phase offset. For example, the oscillation frequency or phase of the local master clock 120 can change or drift. The oscillation frequency or phase of the local master clock 120 can change or drift due to environmental variables including, for example, time, temperature, gravity, tilt, pressure, impact, force, shock, low power or power loss. Synchronizing can refer to adjusting a time of the clock. For example, the local master clock 120 can indicate a first time stamp for a first time that is different from a second time stamp provided by the global reference clock 112 for the same first time. The system 100 can determine that the local master clock 120 is out of synchronization with the global reference clock 112 because the first time stamp is different from the second time stamp.

In some cases, the local master clock 120 can be out of synchronization with the global reference clock 112 and have a frequency error relative to the global reference clock 112. In some cases, the local master clock 120 can only have a frequency error or a synchronization error relative to the global reference clock 112.

The system 100 can determine the frequency error, whether it be the frequency of oscillation or phase offset of the oscillation, by comparing the oscillation of the local master clock 120 with the oscillations of the global reference clock 112. The system 100 can obtain a first signal generated by the local master clock 120 that indicates the oscillations of the local master clock 120. The system 100 can obtain a second signal generated by the global reference clock 112. The system 100 can compare the first second signal with the second signal to determine one or more differences.

The system 100 can calculate or determine a parameter or characteristic of the first signal or the second signal, and compare the parameter or characteristic of the first signal and the second signal. For example, the system 100 can determine the oscillation frequency of the first signal, and determine the oscillation frequency of the second signal. The system 100 can further determine that the oscillation frequency of the first signal varies from the oscillation frequency of the second signal. Responsive to determining that the oscillation frequency of the first signal varies from the oscillation frequency of the second signal, the system 100 can determine to adjust the oscillation frequency of the first signal to match or otherwise correspond to the oscillation frequency of the second signal.

The system 100 can use one or more techniques to determine the frequency of the first signal or the second signal. For example, the system 100 (e.g., FPGA 110) can be configured to perform a Fourier Transform or Fast Fourier Transform on the first signal or the second signal to determine the frequency spectrum of the signal. The signals can contain a single frequency, in which case the frequency spectrum may indicate an impulse at a specific frequency. Another technique can include performing a peak detection or local peak detection technique on the signals. The number of peaks in a second can correspond to the frequency of the signal.

In some cases, the system 100 can determine a phase offset between the first signal and the second signal. The system 100 can determine the phase offset by determining the offset between peaks of the first signal and the second signal, or other reference points in the signal.

The first device 102 can receive a reference signal from the global reference clock 112 of the second device 104, and then use the reference signal to syntonize the local master clock 120. For example, the data processing system 106 of the second device 104 can transmit, via the transmitter 114 of the second device 104, to the first device 102, one or more reference pulses (e.g., one pulse per second or other pulse rate interval) that is generated based on the second clock 112. The first device 102 can use the one or more reference pulses received, via the receiver 116 of the first device, from the data processing system 106 of the second device 104, to syntonize the first clock 120 of the first device 102.

Upon syntonizing the local master clock 120, the first device 102 can provide an indication that the local master clock 120 has been syntonized. The indication can include a status indicator. In some cases, the first device 102 can transmit a signal generated by the syntonized local master clock 120 to the second device 104 via the optical communications link 118 for verification by the second device 104. The second device 104 can receive the signal from the syntonized local master clock 120 via the optical communications link 118, compare the received signal with the reference signal generated by the global reference clock 112, and determine whether the local master clock 120 was successfully syntonized.

In some cases, the system 100 can determine that the local master clock 120 still contains a frequency error or timing error, and continue the syntonization or synchronization process until the local master clock 120 is syntonized or synchronized. Responsive, to syntonizing or synchronizing the local master clock 120, the system 100 can instruct the first device 102 to enter a low power state. The system 100 can instruct the first device 100 to enter the low power state subsequent to syntonization of the frequency of the local master clock 120. The low power state can refer to a state or mode in which the first device 102, or one or more component of the first device 102, is in standby, operating passively, inactive, disabled, turned off, operating in an economy mode or low power mode, or otherwise conserving power or energy relative to an operational state. In some cases, the first device 102 can maintain operation of the local master clock 120 such that the local master clock 120 remains synchronized and syntonized, while disabling one or more other components of the first device 102 without affecting the accuracy of the local master clock 120. The first device 102 or one or more component thereof, can to exit the low power state and acquire seismic data in an operational state.

In some cases, the second device 104 can instruct the first device 102 to enter the low power state subsequent to syntonization or synchronization of the local master clock 120. In some cases, the first device 102 can automatically enter the low power state responsive to determining the local master clock 120 is synchronized and syntonized. In some cases, the first device 102 can receive an indication from the second device 104 indicating that the local master clock 120 is synchronized or syntonized, and further instructing the first device 102 to enter the low power mode.

The data processing system 106 of the second device 104 can transmit information to synchronize and syntonize the first clock 120 as well as instruct the first device 102 to perform an action or enter a state. For example, the second device 104 can identify a data frame clock signal to provide via the optical communication link 118. The data frame clock signal can include or indicate one or more reference pulses, a reference pulse per second, a reference frequency, a reference phase, a reference time stamp, or other reference signal. The data processing system 106 of the second device can transmit, via the optical communications link, a data stream comprising the data frame clock signal. The data processing system 106 can transmit, via the optical communication link 118, one or more data frames to the first device 102 that include or convey payload data to the first device 102 and tune the first clock.

The first device 102 can receive the data stream or one or more data frames via the optical communication link 118. The first device 102 can parse the data stream to identify the data frame clock signal and payload data. The first device 02 can tune the local master clock 120 based on the data frame clock signal provided by the data processing system 106 of the second device 104. The first device 102 can further control operation (e.g., a mode or state of a component of the first device 102) of the first device 102 responsive to an instruction embedded in the payload data. For example, the payload data can include an instruction to enter a low power mode, exit a low power mode, acquire seismic data, acquire sensor data, perform a diagnostic process, or transmit data.

In some cases, the system 100 (e.g., one or both of the data processing systems 106 of the first device 102 and the second device 104) can measure, determine or identify a timing variation of seismic data acquired by the first device 102. The timing variation can be determined subsequent to seismic data acquisition, or subsequent to second device 104 receiving the seismic data from the first device 102. The system 100 can produce a time variation function based on the timing variation. For example, the time variation function can indicate the time offset or frequency offset as a function of time, and can be used to remove timing errors from the acquired seismic data. The time variation function can be based on historical performance of a seismic data reference clock associated with the seismic data acquisition unit. For example, the time variation function can be based on historical performance corresponding to environmental parameters, such as temperature, gravity, tilt, inclination, pressure, time, or other environmental parameter. For example, the frequency of the seismic data reference clock may vary based on temperature, which can be determined using historical performance information (e.g., measurements of the frequency of the clock correlated with the temperature of the clock, first device, or an ambient temperature taken at the time of the measurements of the frequency of the clock). The system 100 (or other external system) can use the time variation function to remove timing errors from the acquired seismic data.

The system 100 can determine a distance between the first device 102 and the second device 104. For example, the system 100 can measure a time delay between a signal transmitted from the extraction vehicle to the seismic data acquisition unit and returned to the extraction vehicle via the optical communications link. The system 100 can measure the time delay between the signals before or after syntonization or synchronization of the first clock 120 on the first device 102. The system 100 can determine the distance between the first device 102 and the second device 104 based on the time delay. For example, the system 100 can measure the time it takes for the signal to be transmitted from the second device 104 to the first device 102, and returned back to the second device 104. The system 100 can account for circuit delays in the first device 102. The difference between the time stamps, accounting for any circuit or processing delays associated with recording or detecting the time stamps, can indicate the distance the signal travels through the optical communications link 118 as follows: speed of light in the aqueous medium multiplied by the time difference can equal the distance between the first device 102 and the second device 104. The system 100 can determine the time delay based on a phase difference in a returned signal. For example, the transmitter 114 of the first device 102 can transmit a signal to the second device 104. The second device 104 can produce a signal that is phase-locked with the signal received from the first device 102. The second device 104 can transmit the phase-locked signal to the first device 102. The first device 102 can determine the phase shift between its own signal and the second device's 104 signal to determine the distance of the second device 104. For example, the distance can be determined as D=speed_of_light*phase_shift/(4*pi*frequency).

The system 100 can include multiple devices, such as multiple first devices 102 and one or more second devices 104. For example, the system 100 can include a plurality of seismic data acquisition units 102. The system 100 can include a first seismic data acquisition unit 102 and a second seismic data acquisition unit 102. In some cases, the extraction vehicle 104 can establish separate optical communications links with each of the plurality of seismic data acquisition units 102. The system 100 can syntonize or synchronize a local master clock 120 of the first seismic data acquisition unit 102 with a local master clock 120 of the second seismic data acquisition unit 102. For example, the local master clocks 120 of the first seismic data acquisition unit may be synchronized or syntonized with the global reference clock 112. To improve the efficiency and speed with which the plurality of seismic data acquisition units are synchronized or syntonized, the first seismic data acquisition unit 102 can facilitate synchronizing or syntonizing the local master clock 120 (e.g., a third clock) of the second seismic data acquisition unit 102 if it is possible to establish an optical communications link 118 between the first and second seismic data acquisition units 102. Thus, the extraction vehicle 104 may not establish optical communications links 118 with each of the plurality of seismic data acquisition units 102.

Figure 2:
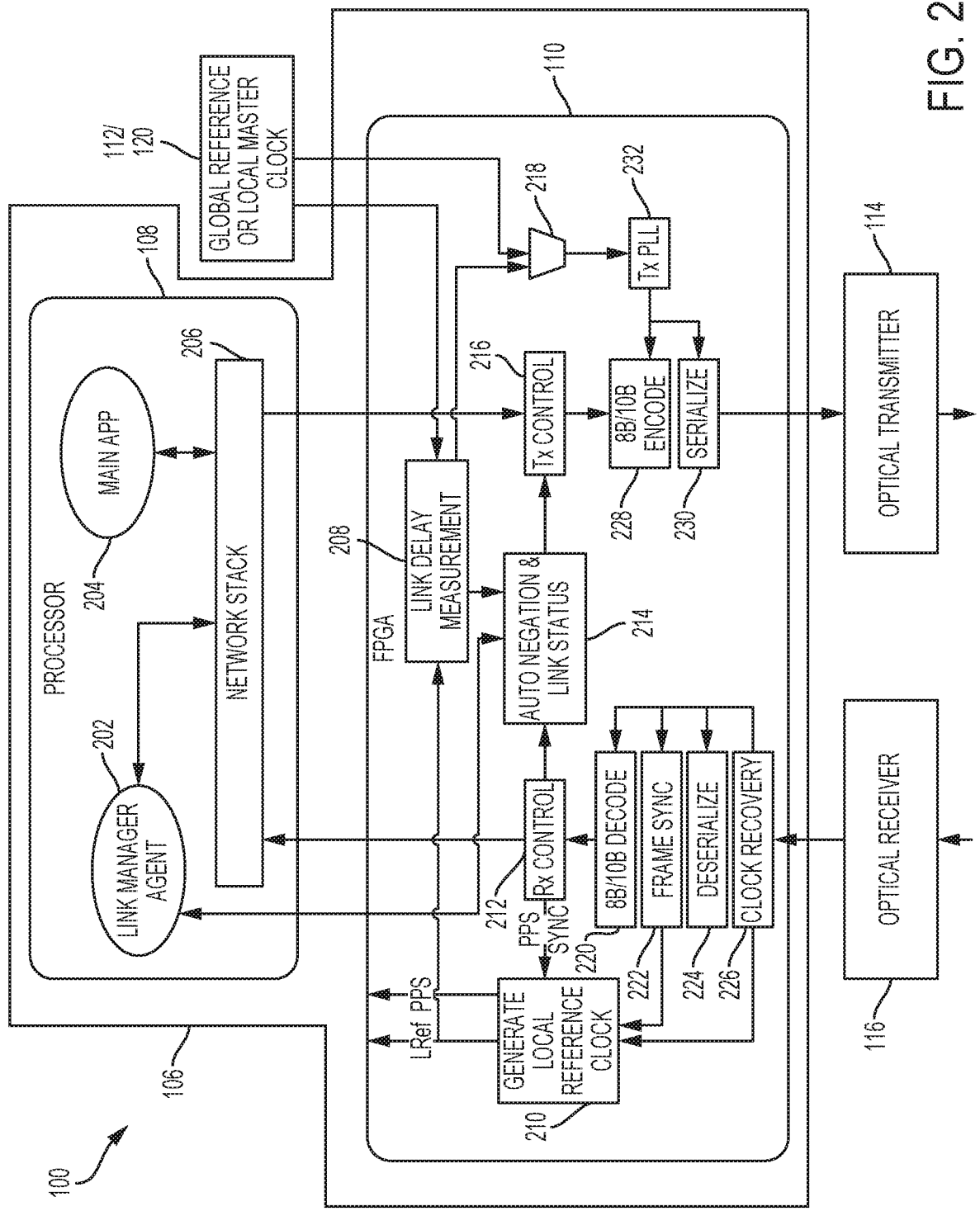
FIG. 2 is a block diagram depicting an optical link timing and frequency synchronization and syntonization system, according to an illustrative implementation.

FIG. 2 is a block diagram depicting an optical link timing and frequency synchronization and syntonization system. FIG. 2 depicts a data processing system 106 that represents one side of the optical communication link 118. The system 100 can be part of or present in the seismic data acquisition units 102 as well as an extraction vehicle 104 such as an autonomous or remote underwater vehicle, or other apparatus that includes an optical system interface ("OZI"). The data processing system 106 can include at least one processor 108, and at least one field programmable gate array (FPGA) 110 (or other integrated circuit or logic device). The system 100 can include at least one global reference clock 112. For example, the global reference clock can be part of the system 100 present in an extraction vehicle (e.g., autonomous or remote underwater vehicle) that communicates with seismic data acquisition units via an optical transmission link. The system 100 can also include at least one local master clock 120. The local master clock 120 can be present in each of the seismic data acquisition units that are part of a seismic survey. The system 100 can also include at least one optical transmitter 114 and at least one optical receiver 116. The optical transmitter 114 and optical receiver 116 can be part of the optical system interface that transmits and receives data between, for example, a seismic data acquisition unit 102 and an extraction vehicle 104 via an optical link 118. The data can include seismic data, clock frequency data and clock timing data, among other data.

The system 100 is capable of clock syntonization (e.g., frequency tuning) and clock synchronization (e.g., timing) of the master clocks of the distributed seismic data acquisition units 102. For example, regarding clock syntonization, to manage the accumulation of time error or drift in digitized acquired seismic data, it is desirable to have the master clocks located in the individual seismic data acquisition units 102 set to a same known frequency value as precisely as possible. The system 100 syntonizes the individual unit master clocks 120 with a global reference clock 112. The global reference clock 112 can be located on the extraction vehicle (as part of the OZI) and has been previously syntonized with the shipboard GPS controlled reference clock that can be present on a vessel associated with a seismic survey.

The global reference clock 112 on the OZI can be used to generate the data stream associated with the optical links 118 between the extraction vehicle 104 and the individual seismic data acquisition units 102. A field programmable gate array (FPGA) 110 present on the seismic data acquisition unit can produce a local reference clock signal from the data frame clock signal received via the optical link. The data frame clock signal can also be used by the FPGA 110 to generate one or more reference pulses or a reference pulse per second (PPS) signal used to tune the local master clock of the remote seismic data acquisition units to correct frequency. The system 100 can determine the proper clock frequency for the optical data stream to reduce accumulated phase errors and avoid the need for a further phase locked loop (PLL), for example by selecting a data frame clock for the optical (or other) communications link that can be directly used by the seismic data acquisition units. In this manner, the system 100 can pass the global reference clock frequency to a plurality of seismic data acquisition units via the optical link data stream. During the time required to tune or syntonize the seismic data acquisition unit (e.g., node or remote unit) master clock, the optical link can be used for other communication purposes as well.

The frequency of the optical data link can be chosen independent of seismic data acquisition unit clock requirements. In this example, a phase locked loop can be used to create the clock frequency used by the seismic data acquisition units so that the portion of the data processing system 106 on the extraction vehicle can operate at a different clock or frame rate than the portion of the data processing system 106 on the seismic data acquisition units. (For example, the frame rate of the portion of the data processing system 106 on the extraction vehicle can be higher than that of the seismic data acquisition unit to facilitate higher speed data extraction without complicating the design of the optical receiver 116.) Further, the data processing system 106 can use or select an optical data link frequency such that the frame clock from the optical receiver 116 meets the requirements of the seismic data acquisition unit, which can simplify the circuitry and logic in the seismic data acquisition unit. The system 100 can select or use an optical link frequency that will result in a clock that can be used directly by the seismic data acquisition units, or can select or use a different (e.g., not directly compatible) frequency for the optical link. When the frequencies are different, the system 100 can create the clock required by the seismic data acquisition unit from the optical link clock.

Clock synchronization (or lack thereof) between seismic data acquisition units can result in timing errors or discrepancies between seismic data collected from various units, and is another source of potential error in seismic data acquisition. This timing error can occur when sampling boundaries of acquired seismic data are not synchronized to an absolute reference. To avoid or minimize these errors, the data processing system 106 can synchronize, using an optical link, remote unit master clocks (present in individual seismic data acquisition units) with a pulse per second (PPS) signal of the global master clock that is located on the extraction vehicle or other device that is remote from the individual seismic data acquisition units. The processor 108 or FPGA 110 on a seismic data acquisition unit can derive the global master clock signal from the optical link data stream. The phase relationship of a locally derived PPS signal may be arbitrary if not aligned to the global reference PPS. The data processing system 106 can accomplish this alignment by sending a designated symbol associated with a frame or packet of the optical data link transmission that is aligned with the occurrence of the PPS of the global reference clock.

The optical data link transmission can include idle symbols or characters that do not represent user data. The data processing system 106 can replace at least one of these idle symbols with a marker symbol that does not interfere with transmissions occurring via the optical link. The processor 108 or FGPA 110 on the seismic data acquisition unit that receives the optical link transmission can use this symbol to align the PPS of the optical link transmission with the locally generated PPS of the seismic data acquisition unit. This alignment phase locks the local clock PPS with the global reference clock PPS as long as the optical data link connects the seismic data acquisition unit with the extraction vehicle or other apparatus.

The data processing system 106 can be part of a seismic data acquisition system 100 that manages the accumulation of timing errors. For example, the local master clocks 120 of the seismic data acquisition units 102 can be syntonized and synchronized prior to the acquisition of the seismic data. This can allow for validation of the performance of the local master clocks to derive sampling boundaries in advance, prior to operation of the seismic data acquisition units to acquire seismic data, which generally sets the initial timing errors to zero or essentially zero. In this example, at the end of the seismic data acquisition, the local master clocks of the individual units can again be measured to determine the variation of the clocks over the seismic data acquisition period. These measurements can be used to derive the time variation function by which the seismic data was acquired. With this function, the acquired seismic data can be re-sampled to remove timing errors that may remain in the acquired seismic data. A drawback of this example is the time it takes at or prior to the start of seismic data acquisition to zero the local clocks of the individual seismic data acquisition units with the remote master clock of, for example, an extraction vehicle, autonomous or remote underwater vehicle, or vessel.

Another implementation that can be employed by the data processing system 106 to manage the accumulation of timing errors is to calibrate (e.g., zero the error) of the local clocks 120 of individual seismic data acquisition units 102 prior to turning the clocks 120 off, and to allow for the appropriate frequency re-trace time to occur before the arrival of the OZI (of the extraction vehicle 104) in the vicinity of a seismic data acquisition unit 102 to extract seismic data from that unit via the optical link transmissions. The data processing system 106 (or other data processing system) can measure the timing variation at the end of the seismic data acquisition process, and can employ historical performance of the clock as well as additional calibration data for the clock to produce the time variation function used to remove timing errors that may remain in the acquired seismic data. The seismic data can be corrected by the data processing system 106 or other data processing system using the time varying functions derived from the measured timing variations. In this example, delivered seismic data can be independent of particular clock technologies employed in the various seismic data acquisition units.

Further, with the precision timing control designs of the optical data communications link, a measurement of the propagation delay between two transmitting devices (e.g., a seismic data acquisition unit and an extraction vehicle) is possible. As depicted in FIG. 1, the optical data communications link transmission path 118 between the OZI of an extraction vehicle 104 and the remote seismic data acquisition unit 102.

The data processing system 106 (or another vessel-based or land based data processing system) can measure the distance between the extraction vehicle 104 (or other OZI location) and individual seismic data acquisition units 102 using the optical link. For example, the data processing system 106 can couple, synchronize, or syntonize the global reference clock 112 with the local master clock 120, and can measure the time delay between the transmitted frame clock (e.g., outbound from the optical transmitter 114 of the OZI on the extraction vehicle 104) via transmission path 118 through the seismic data acquisition unit 102 and back out from the optical transmitter 114 of the seismic data acquisition unit 102 to the extraction vehicle 104. From this time delay, and accounting for propagation delays, circuit delays, and other geometry measurements or delay factors along the transmission path 118, the data processing system 106 (or other data processing system) can calculate the distance between the extraction vehicle 104 and the seismic data acquisition unit 118.

The processor 108 can include, provide, execute or interface with a link manager agent 202, a main application 204 and a network stack 206. The link manager agent 202 can be designed and configured to initiate, establish or maintained the optical communications link 118 between the first device 102 and the second device 104. The link manager agent 202 can perform a wake-up process or handshaking process to establish the link and verify that the link is communicating data. The network stack 206 can refer to a protocol stack, such as a computer protocol suit. The network stack 206 can include a software implementation of the definition of the protocols. The network stack 206 can be divided into different protocols (e.g., HTTP, TCP, IP, Ethernet, or IEEE 802.eu) or different layers (e.g., application layer, transport layer, internet/network layer, data link/link layer, or physical layer). The network stack 206 can refer to a combination of hardware and software that implements Ethernet network protocols (e.g., TCP, IP, or UDP). The network stack 206 can implement the transmit side of the network used on link 118. Network stack 206 transforms data from the link manager agent 202 and into the requested packet type (e.g., UDP or TCP/IP) for transmission on link 118. Network stack 206 can receive data packets in a standard form (e.g., UDP or TCP/IP) and deliver it to the link manager agent 202.

The main application 204 is designed to provide functions to support operations of the seismic data acquisition device 102. The main application 204 can function as the software bridge portion of the communications link between the recording system and the seismic data acquisition unit's operational processes. The main application 204 can provide the recording system with access to the stored seismic data, self-test results, stored peripheral data such as pressure, orientation, or battery logs. The main application 204 can respond to commands such as enter sleep state, start seismic data acquisition, or tune local master clock. The main application 204 can respond to commands by executing the command or facilitating the execution of the command by interfacing with one or more other components.

The FPGA 110 can include a link delay measurement component 208, a generate local reference clock 210 component, a receive control component 212, an auto negation and link status component 214, a transmit control component 216, a logic gate 218, an 8-bit to 10-bit (8B/10B) decoder component 220, a frame sync component 222, a deserializer component 224, a clock recovery component 226, an 8B/10B encoder component 228, a serializer 230, and a transmit PLL 232.

The link delay measurement component 208 can determine the phase difference between local master clock 120 and the recovered clock from the clock recovery component 226. This information can be used to determine the time delay between the first device 102 and the second device 104 and thus calculate the distance between them. The generate local reference clock component 210 can provide the clock for the link delay measurement component 208. This clock can be the recovered frame clock if the link is running at the required rate or the clock can be generated from the received frame clock. The generate local reference clock component 210 can provide the reference clock and pulse per second (PPS) signal used to syntonize and sychronize the local master clock 120.

The receive control component 212 can provide the special symbol decode indication for aligning or synchronizing the local PPS generation and subsequently synchronizing the PPS of the local master clock 120. The receive control component 212 can provide both receive status information and any necessary information for the auto negotiation phase of link establishment.

The auto negotiation and link status component 214 can provide the low level local receiver information used in the establishment of a link. This low level link status information can be sent to the paired link manager agent as part of link establishment protocols.

The transmit control component 216 can provide symbol encoding of local receiver information, the sending of reference PPS boundaries, and other network controls. The logic gate 218 can allow for the selection of the desired clock reference for the transmitted bit stream. This can be used for the distance measurement mode of the link. The 8B/10B decoder component 220 can converts the 10 bit received symbols back to the original 8 bit data value. The 8B/10B encoding technique is one of several encodings that can be used to provide a controlled distribution of ones and zeros on a digital transmission system that allows for clock recovery from the data pattern itself.

The frame sync component 222 can synchronize the local receivers frame boundary to that of the transmitted data. This can allow for proper symbol extraction and subsequent decoding of the symbols back to the original data. The deserializer component 224 can convert the digital bit stream from a serial form to a parallel form. For example, the deserializer component 224 can convert a series of ones and zeros to 10 bit wide symbols.

The clock recovery component 226 can extract the transmitted bit clock from the received data stream. This bit clock can be used to digitize the data stream for subsequent evaluation and decoding of the transmitted data. The 8B/10B encoder component 228 can convert the user 8 bit wide data values to a 10 bit wide symbol that allows for the controlled distribution of ones and zeros in the transmitted data stream. The serialize component 230 can convert the 10 bit wide symbols to a stream of ones and zeros for transmission on the link. The transmit PLL component 232 can provide the proper frame and bit clocks for encoding and transmitting the digital data on the link.

Referring to FIG. 1 and FIG. 2, the link delay measurement component 208 can include the controls needed to drive the local optical transmitter 114 with the derived received frame clock (e.g., instead of the global reference clock 112 or local master clock 120) and to provide the phase measurement function. The OZI of the extraction vehicle 104 (or of another apparatus) can command the seismic data acquisition unit 102 to switch its transmit frame clock (e.g., derived from the local master clock 120) to instead use its received frame clock (e.g., derived from the received data and thus the global reference clock 112) for optical link data transmission via the transmission path 118. Then, the data processing system 106 would enable the local phase measurement logic and determine two-way propagation delay. After applying compensations for the velocity of data transmissions through water, circuit delays, two way travel delays, and physical geometry of the optical communications link, the data processing system 106 can determine the distance between the seismic data acquisition unit 102 and the extraction vehicle 104. The data processing system 106 or another data processing system can refine this distance value using smoothing functions or statistical averaging techniques.

Referring to FIG. 1 and FIG. 2, in some examples clock syntonization or frequency calibration of the seismic data acquisition units by the system 100 can take longer (e.g., minutes) than clock synchronization (e.g., seconds). Further, drift from a calibrated or syntonized state can be a function of seismic data acquisition unit operation, so that the seismic data acquisition units may not drift (or drift less) when they are in a shut-down, sleep, low power, or off state. When the seismic data acquisition units are restarted they can restart in a syntonized state. Accordingly, in some implementations the data processing system 106 syntonizes or calibrates the frequency of seismic data acquisition units subsequent to deployment and prior to entry of the seismic data acquisition units into a low power, off, shut-down, or sleep state. The seismic data acquisition units can then be re-started prior to data acquisition with their respective clocks sufficiently syntonized or calibrated to acquire useable seismic data. The clock frequency of the respective clocks of the seismic data acquisition units can be synchronized subsequent to this re-start, (or in some examples prior to shut-down) by the data processing system 106. By syntonizing seismic data acquisition unit frequency prior to shut-down, the seismic data acquisition units need not be re-syntonized during a re-trace time at startup. This saves time, as in this example, frequency synchronization at startup is faster than frequency syntonization.

Figure 3:
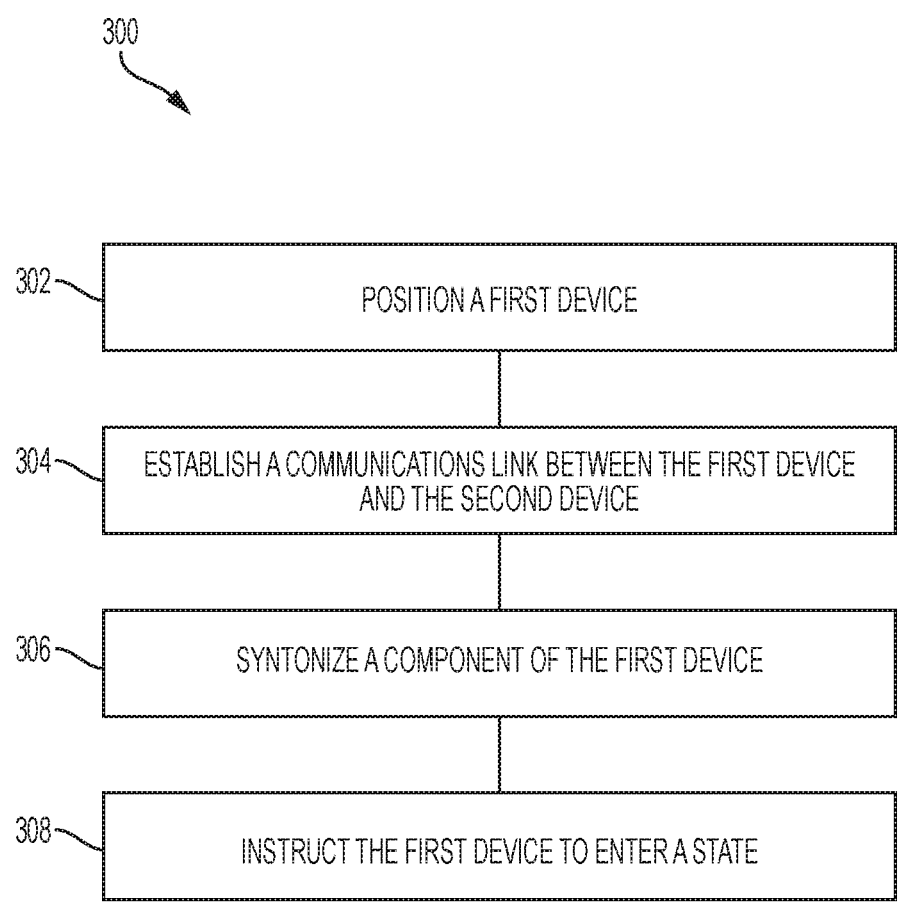
FIG. 3 is a block diagram depicting a method of optical link timing and frequency synchronization and syntonization, according to an illustrative implementation.

FIG. 3 is a block diagram depicting a method of optical link timing and frequency synchronization and syntonization. The method 300 can be performed by one or more component or system depicted in FIGS. 1 and 2, including, for example, system 100, data processing system 106, transmitter 114, receiver 116, global reference clock 112 or local master clock 120. The method 300 can include positioning a first device at 302. The method 300 can include establishing a communication link between the first device and the second device at 304. The method 300 can include syntonizing a component of the first device at 306. The method 300 can include instructing the first device to enter a state at 308.

At 302, the method 300 can include positioning a first device. The first device, such as a seismic data acquisition unit, can be positioned on a seabed in a marine environment. In some cases, a second device, such as an extraction vehicle or ROV, can position the first device on the seabed. The method 300 can include positioning one or more devices on the seabed. The seismic data acquisition unit can include a first clock and a first data processing system.

At 304, the method 300 can include establishing a communication link between the first device and the second device. For example, the extraction vehicle can establish an optical communications link with the seismic data acquisition unit. The extraction vehicle can include a second clock and a second data processing system. Establishing the optical communications link can include performing a wake up process, initialization process, handshaking process, or link maintenance process.

The method 300 can include syntonizing a component of the first device at 306. For example, the data processing system of the first device or the second device can syntonize, via the optical communications link, a frequency of the first clock of the seismic data acquisition unit to correspond to the second clock. The data processing system can synchronize the first clock with the second clock. To syntonize or synchronize the first clock, the data processing system can transmit one or more reference pulses or a reference pulse per second based on the second clock. The seismic data acquisition unit can use the reference pulse per second to syntonize the first clock.

At 308, the method 300 can include instructing the first device to enter a state. For example, the data processing system of the first device can instruct the data processing system of the seismic data acquisition unit to enter a low power state subsequent to syntonization of the frequency of the first clock.

Figure 4:
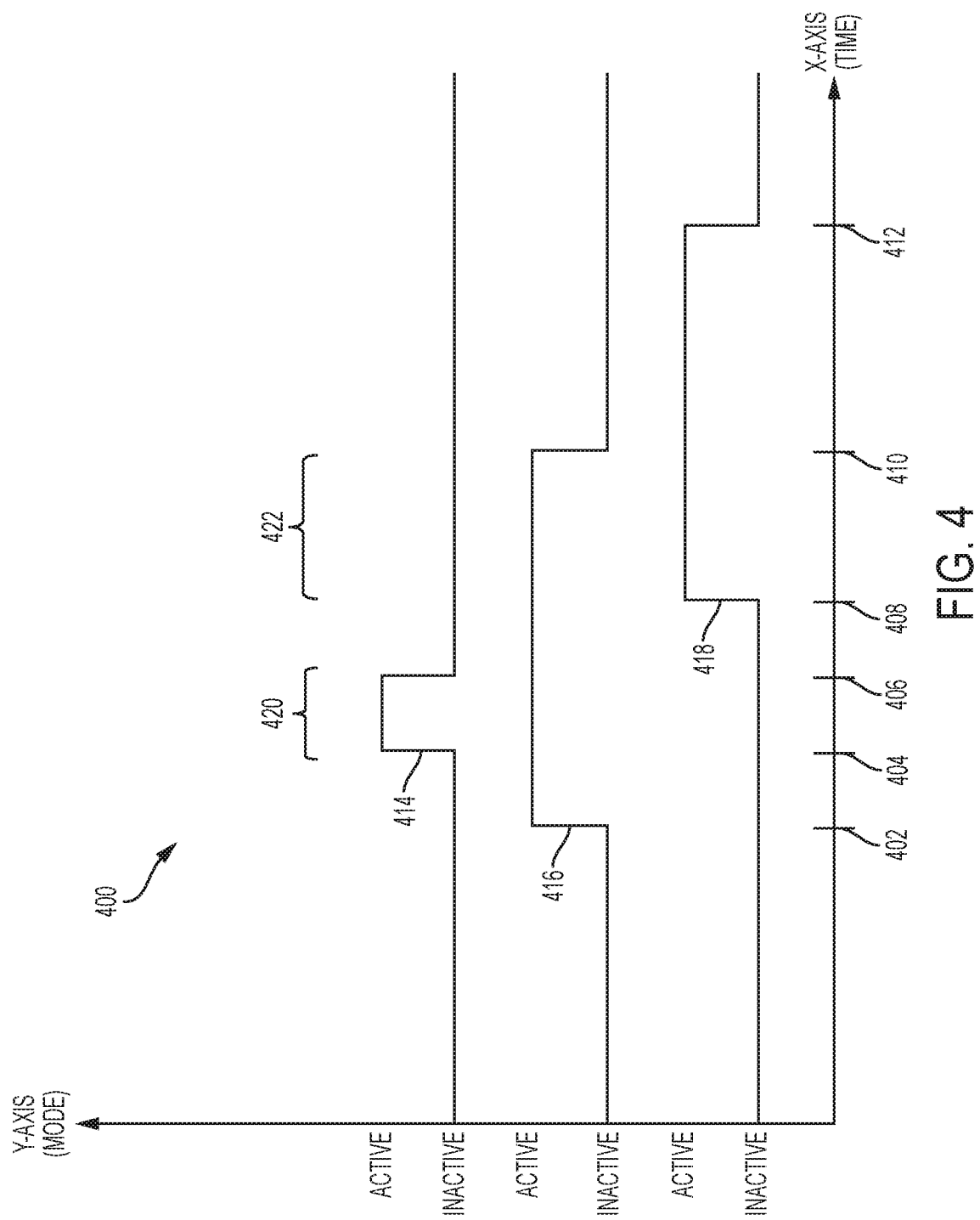
FIG. 4 is a chart depicting timing windows for synchronization and syntonization, according to an illustrative implementation.

FIG. 4 is an example chart depicting timing windows for synchronization and syntonization. The timing windows can be used by system 100. The chart 400 includes an x-axis corresponding to time, and a y-axis corresponding to a mode. The pulse 414 can indicate synchronization, the pulse 416 can indicate syntonization, and the pulse 418 can indicate link data transfer (e.g., seismic or other sensor data transfer on the link). As illustrated in chart 400, clock syntonization 416 can begin at time 402 and continue until time 410, when syntonization is complete. Clock synchronization 414 can begin at time 404 and end at time 406, when clock synchronization is complete. Data transfer can begin at time 408 and continue until time 412, when data transfer is complete.

For example, it may take less time to synchronize the clock as compared to syntonizing the clock. It may take less time to syntonize the clock as compared to data transfer. For example, the duration of synchronization pulse 414 can be less than one second, one second, 1.2 seconds, 1.5 seconds, 1.7 seconds, 2 seconds, 3 seconds, 4 seconds, 5 seconds, or more. The duration of the syntonization pulse 416 can be 15 seconds, 30 seconds, 45 seconds, 60 seconds, 90 seconds, 2 minutes, 3 minutes, 4 minutes, or more. The duration of the data transfer pulse 418 can be 15 seconds, 30 seconds, 45 seconds, 60 seconds, 90 seconds, 2 minutes, 3 minutes, 4 minutes, or more.

During time window 420, clock synchronization 414 can overlap with clock syntonization 416. For example, both clock synchronization 414 and clock syntonization 416 processes can be active. During time window 422, clock syntonization 416 and data transfer (or link use) 418 can be active. Thus, in some cases, data transfer 418 can occur subsequent to clock synchronization 414 completes, but while clock syntonization 416 is still active.

Figure 5:
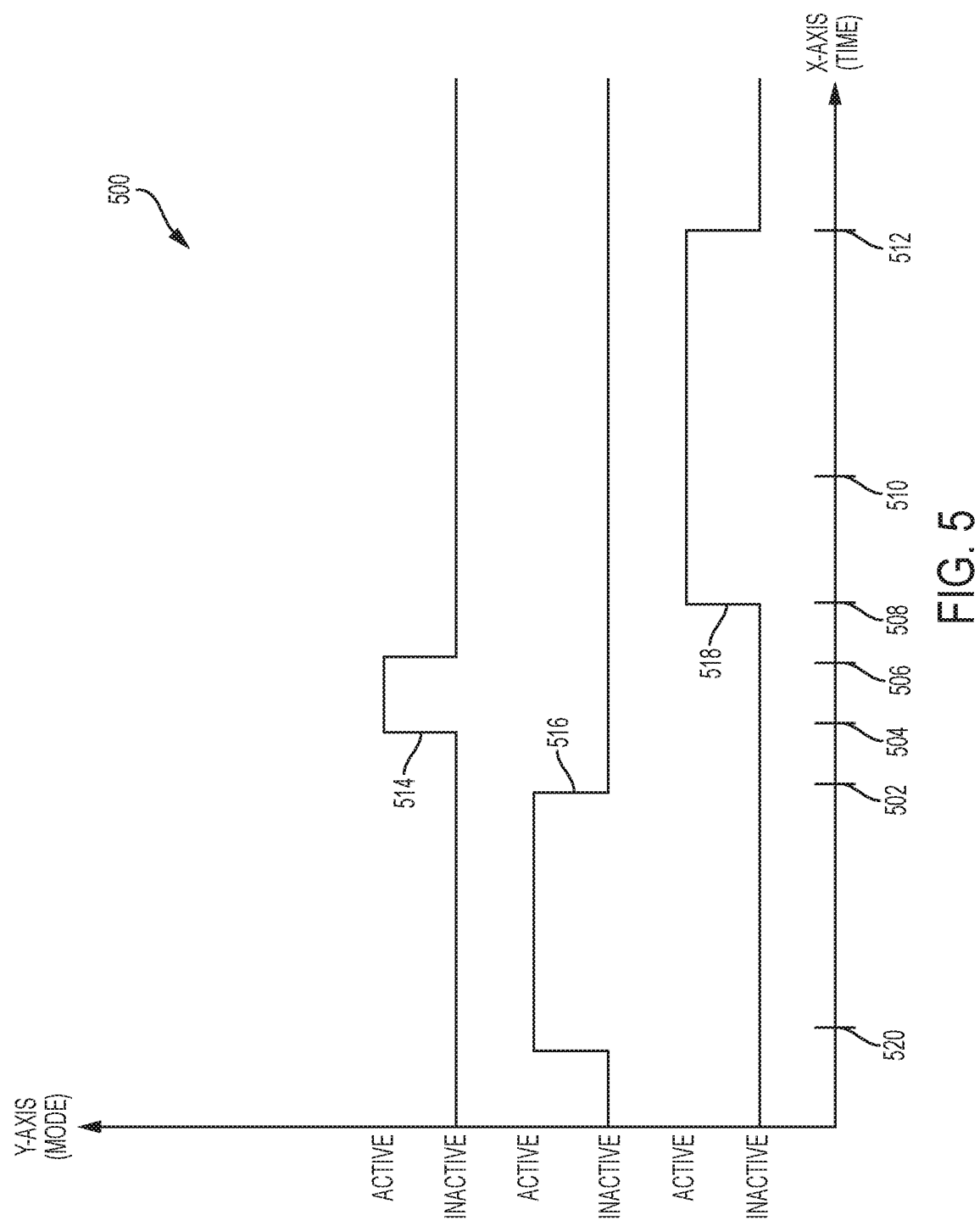
FIG. 5 is a chart depicting timing windows for synchronization and syntonization, according to an illustrative implementation.

FIG. 5 is a chart depicting timing for synchronization and syntonization. The timing can be used by system 100. The chart 500 includes an x-axis corresponding to time, and a y-axis corresponding to a mode. The pulse 514 can indicate synchronization, the pulse 516 can indicate syntonization, and the pulse 518 can indicate link data transfer (e.g., seismic or other sensor data transfer on the link). As illustrated in chart 500, clock syntonization 516 can begin at time 520 and continue until time 502, when syntonization is complete. Clock synchronization 514 can begin at time 504 and end at time 506, when clock synchronization is complete. Link data transfer can begin at time 508 and continue through time 510 and until time 512, when data transfer is complete. Time 510 can indicate a mid-point of data transfer, or a second acoustic shot.

In the example illustrated in chart 500, none of clock synchronization 514, clock syntonization, and data transfer 518 may be active during the same time or overlap. In this example, clock synchronization 514 occurs subsequent to clock syntonization 516, and data transfer 518 occurs subsequent to clock synchronization 514.

In some cases, the system 100 can perform one or more of synchronization, syntonization, or data transfer at different times, in different orders, or at the same time. Synchronization, syntonization, or data transfer can overlap, at least partially overlap, or be mutually exclusive.

FIG. 6 is a block diagram depicting a system for calibrating a pressure sensor via an optical link. FIG. 6 depicts a system 100 that can include at least one first device 102 (e.g., at least one seismic data acquisition unit) and at least one second device 104 (e.g., at least one extraction vehicle such as an autonomous or remote underwater vehicle, or other apparatus that includes an OZI). The data acquisition unit 102 and the extraction vehicle 104 can each include at least one processor 108, and at least one field programmable gate array (FPGA) 110 (or other integrated circuit or logic device). The extraction vehicle 104 can include at least one global reference clock 112. For example, the global reference clock 112 can be part of the extraction vehicle 104 (e.g., autonomous or remote underwater vehicle) that communicates with seismic data acquisition units 102 via an optical (or other type of) transmission link 118. The seismic data acquisition unit 102 can include at least one local master clock 120. The local master clock 120 can be present in each of the seismic data acquisition units 102 that are part of a seismic survey. The seismic data acquisition unit 102 can include at least one local pressure transducer (or other pressure sensor) 140. The extraction vehicle 104 can include at least one reference pressure transducer (or other pressure sensor) 145.

The data acquisition unit 102 and the extraction vehicle 104 can include at least one transmitter 114 (e.g., an optical transmitter) and at least one receiver 116 (e.g., an optical receiver). The optical transmitter 114 and optical receiver 116 can be part of the optical system interface that transmits and receives data between, for example, a seismic data acquisition unit 102 and an extraction vehicle 104 via an optical link 118. The data can include pressure sensor data, pressure sensor data commands, seismic data, clock frequency data and clock timing data, among other data. For example, the extraction vehicle 104 can transmit pressure data obtained from the reference pressure transducer 140 to the seismic data acquisition unit 102 to replace, calibrate, or adjust pressure data sensed by the local pressure transducer 145.

The system 100 is capable of pressure sensor data synchronization, calibration, or adjustment. For example, the extraction vehicle 104 (via the processor 108, FPGA 110 and other components) can transmit pressure sensor data via the optical transmission link 118 to confirm, change, calibrate or adjust the determined pressure sensed by the local pressure transducer 145. The seismic data acquisition unit 102 can also transmit pressure data (among other data) to the extraction vehicle 104 via the optical transmission link 118. The synchronized or adjusted pressure data can be used during seismic data interpretation to help refine the acoustic velocity model or can be used to help identify reservoir subsidence or other uses. Thus, the improved pressure data or data collected via a calibrated pressure sensor can improve the quality or accuracy of the data by providing a more precise value of the depth of the sensor, which can result in a relatively higher quality image formed from the seismic data, as compared to an uncalibrated pressure sensor that provides an inaccurate or less accurate depth measurement.

The system 100 can provide precision pressure measurements of or from one or more seismic data acquisition units 102 that are deployed, for example, on a seabed or lakebed. The resolution can be accurate to the meter, tens of centimeters, centimeter, or sub-centimeter level. The local pressure transducer 145 and the reference pressure transducer 140 can operate at sub-marine depths of hundreds to thousands of meters. The system 100 compensates for pressure measurement drift of individual local pressure transducers 145 over time by, for example, transmitting calibration or other pressure data via the optical transmission link 118. For example, to provide information to allow for compensation of long term drift associated with local pressure transducers 145 present on a seabed for a period of time, pressure data from each local pressure transducer 145 (e.g., on respective seismic data acquisition units 102) can be compared to a known reference, such as pressure data from the reference pressure transducer 140 of the extraction vehicle 104 that can operate at the same or similar (e.g., within tens of meters) depth as the seismic data acquisition unit 102 and at a known or determined distance from the seismic data acquisition unit 102.

Through the optical transmission link 118, the system 100 can measure the precise distance between the extraction vehicle 104 and the seismic data acquisition unit 102. By incorporating a calibrated pressure reference into the logic devices of the extraction vehicle 104, the extraction vehicle 104 can provide the seismic data acquisition unit 102 with a time and reference update, via the optical transmission link 118, which can be used to compensate for drift in the local pressure measurement made by the local pressure transducer 145. To accomplish the reference update, the optical link data transmission provides an accurate distance between the extraction vehicle 104 and the seismic data acquisition unit 102, as well as the precise position of the reference pressure transducer 140 and of the local pressure transducer 145. The position can include, for example, a position of the reference pressure transducer 140 relative to the local pressure transducer 145. The position can include coordinates in one or more axes, such as an x-axis, y-axis, and z-axis coordinates. The position can include position information relative to point different from the seismic data acquisition unit, such as a fixed reference point or a moving reference point. Fixed or moving reference points can include, for example, a point on the seabed, the seismic data acquisition unit, an underwater vehicle, a marine vessel, or other reference point. The position can include rotational information, such as pitch, yaw or roll. Additionally, multiple readings can be performed to provide for sufficient statistical measurements to compensate for motion associated with the extraction vehicle 104. The distance measurements can be accurate to the meter, tens of centimeters, centimeter, or sub-centimeter level. The system 100 can compensate for an angular error in the distance measurement due to a misalignment of the seismic data acquisition unit 102 and the extraction vehicle 104. For example, the system can compensate for angular error using a camera to determine an angular position of the seismic data acquisition unit 102 relative to the vehicle 104, such as how centered (e.g., a degree of centering) the vehicle 104 is over the unit 102. The system 100 can use multiple receivers to measure a time delay between two received signals and use time delay to compute an angular correction to the distance measurement.

The extraction vehicle 104 can visit one or more deployed seismic data acquisition units 102 on the seabed and establish the optical transmission link 118. The reference pressure transducer 140 can determine a pressure of the extraction vehicle 104. The extraction vehicle 104 can also determine the distance between the extraction vehicle 104 and the seismic data acquisition unit 102. Based on the pressure (at the extraction vehicle 104 from the reference transducer 140) and the distance (e.g., a vertical distance) between the extraction vehicle 104 and the seismic data acquisition unit 102, the processor 108 of the extraction vehicle can determine what the pressure is at the location of the seismic data acquisition unit 102. The extraction vehicle 104 can provide this information to the seismic data acquisition unit 102 via the optical transmission link 118. The seismic data acquisition unit 102 can then use or record this received pressure information, e.g., as an alternative, replacement, or supplement to pressure data obtained from the local pressure transducer 145. The seismic data acquisition unit 102 can also recalibrate the local pressure transducer 145 based on this information.

The extraction vehicle 104 can also obtain pressure data from the local pressure transducer 145 of the seismic data acquisition unit 102 and compare this information with the pressure information of the reference pressure transducer 140 to determine a drift that has occurred with the local pressure transducer 145 readings. The drift can occur at least in part due to the presence of the seismic data acquisition units 102 on the seabed for an extended period of time, such as weeks, months, or longer. This drift value from a true pressure reading can be used to recalibrate, reset, adjust, the logic devices of the seismic data acquisition unit 102, to replace the pressure data obtained by the local pressure transducer, or can be applied to acquired seismic data to facilitate data interpretation to determine, for example, in refining the acoustic velocity model or can be used to help identify reservoir subsidence or other uses.

With a large number (e.g., tens, hundreds or thousands) of seismic data acquisition units 102 deployed on a seabed, accurate processing or interpretation of acquired seismic data can rely on an accurate measurement of the depth of the seismic data acquisition units 102. The system 100 can determine, based on calibrated one or more pressure values and historical tidal conditions, a depth of the seismic data acquisition unit. For example, based on local or seasonal tidal conditions (e.g., low tide or high tide), water pressure, and atmospheric or barometric pressure, the system 100 or another data processing system can determine the precise depth of the individual local pressure transducers 145 of the seismic data acquisition units 102. The depth measurements can be accurate to the meter, tens of centimeters, centimeter, or sub-centimeter level. To, for example, improve gravimetric data acquired from a marine environment, the system 100 or other data processing system can correct for the effects of hydrostatic pressure. The precise pressure measurements obtained by the system 100 allow for this correction.

Further, oil, gas, hydrocarbon, or other mineral extraction from reservoirs in the earth can cause subsidence of the reservoir. Subsidence can cause many different production and ecologic problems related to extraction infrastructure or containment for example. In a marine environment, accurately measuring subsidence, e.g., of a seabed can be challenging as depth accuracy of the seismic data acquisition units 102 can be needed to determine subsidence. The system 100 can determine the depth from the pressure measurements made by the local pressure transducers 145, and can use these depth measurements to determine subsidence at a meter, centimeter, or sub-centimeter scale. The depth value can also be determined from gravimetric data.

Figure 7:
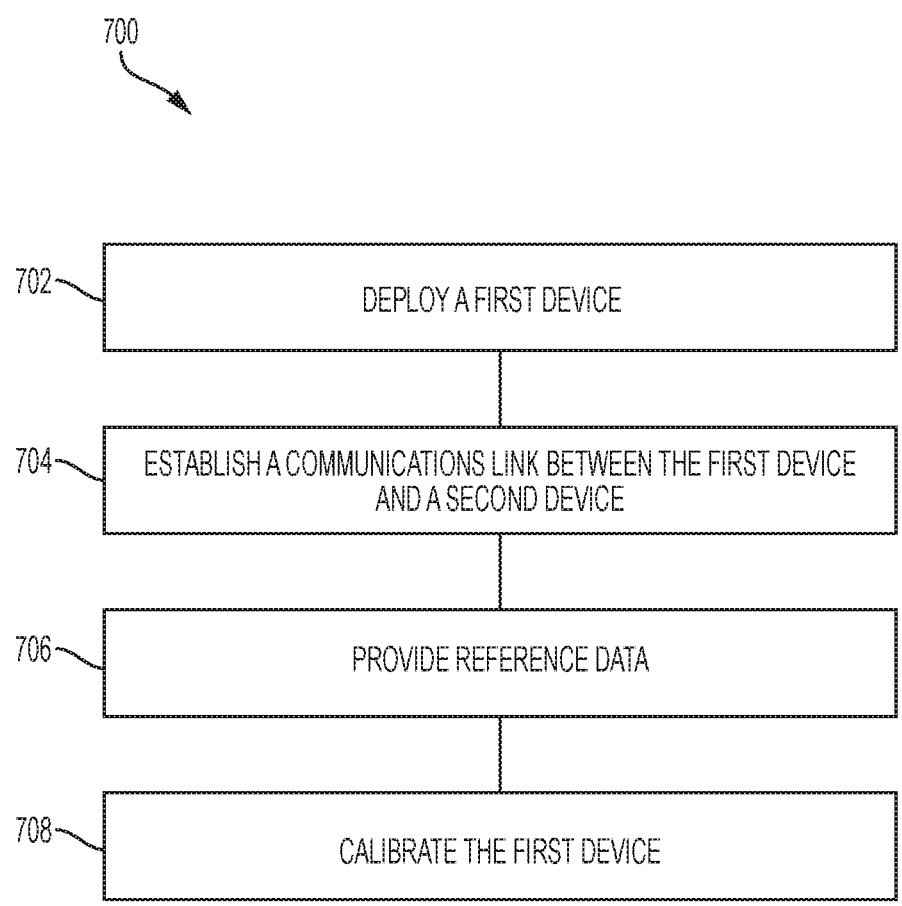
FIG. 7 is a block diagram depicting a method for calibrating a sensor via an optical link, according to an illustrative implementation.

FIG. 7 is a block diagram depicting a method for calibrating a sensor via an optical link. The method 700 can be performed by one or more system, component or module depicted in FIGS. 1, 2, and 6. The method 700 can include deploying a first device at act 702. At act 704, the method 700 can include establishing a communications link between the first device and a second device. At act 706, the method 700 can include providing reference data. At act 708, the method 700 can include calibrating the first device.

At act 702, the method 700 can include deploying a first device. For example, a seismic data acquisition unit can be on a seabed in a marine environment. The seismic data acquisition unit can include a local pressure sensor, an optical transmitter and an optical receiver. The seismic data acquisition unit can be deployed by an ROV.

At act 704, the method 700 can include establishing a communications link between the first device and a second device. For example, the second device can include an extraction vehicle including a reference sensor, an optical transmitter and an optical receiver. The reference sensor can include, for example, a reference pressure sensor, reference clock, or reference temperature sensor. The extraction vehicle can establish an optical communications link with the seismic data acquisition unit.

At act 706, the method 700 can include providing reference data. For example, the extraction vehicle can provide or transmit, to the seismic data acquisition unit via the optical communication link, reference pressure data. The extraction vehicle can provide, to the seismic data acquisition unit via the optical communication link, one or more of reference pressure data including a pressure value, a time stamp corresponding to detection of the pressure value by the reference pressure sensor, an indication of the distance between the extraction vehicle and the seismic data acquisition unit, and a position of the reference pressure sensor relative to the local pressure sensor of the seismic data acquisition unit.

At act 708, the method 700 can include calibrating the first device. For example, one or more processors of the system 100 can calibrate, based on the reference pressure data, the local pressure sensor or one or more pressure values measured by the local pressure sensor. In some cases, the seismic data acquisition unit can calibrate the local pressure sensor based on the reference pressure data received from the extraction vehicle. The local pressure sensor can be calibrated based on the reference pressure data providing one or more pressure values.

To calibrate the pressure data or pressure sensor, the first device or second device can determine a plurality of reference pressure values generated by the reference sensor of the second device. The first device or second device can generate a reference pressure metric based on a statistical technique applied to the plurality of reference pressure values. For example, the reference pressure metric can be an average pressure, weighted average pressure, mode pressure value, median pressure value, or normalized pressure value. If the second device determines the reference pressure metric, the second device can transmit the generated reference pressure metric to the first device to cause the first device to calibrate the local pressure sensor.

In some cases, the seismic data acquisition unit can calibrate one or more pressure values previously measured by the local pressure sensor to generate one or more calibrated pressure values. For example, the seismic data acquisition unit can record the pressure values prior to calibration. Upon calibration, the seismic data acquisition unit can update the recorded pressure values to reflect calibrated pressure values. One or more component of the system can calibrate previously recorded pressure values.

The second device (e.g., extraction vehicle) can provide the reference sensor data based on a distance between the second device and the first device (e.g., the seismic data acquisition unit). The second device can provide the reference sensor data corresponding to sensor measurements taken when the distance between the first device and the second device is within a threshold (e.g., 3 inches, 6 inches, 12 inches, 2 feet, 3 feet, 6 feet, 8 feet, 10 feet, 15 feet, 20 feet, or more). For example, the extraction vehicle can determine a distance between the extraction vehicle and the seismic data acquisition unit. The extraction vehicle can instruct the reference pressure sensor to obtain the reference pressure data based on the distance between the extraction vehicle and the seismic data acquisition unit. For example, the extraction vehicle can instruct the reference pressure sensor to obtain the reference pressure data responsive to the distance between the extraction vehicle and the seismic data acquisition unit being less than the threshold. The extraction vehicle can periodically instruct the reference pressure sensor to obtain the reference pressure data once the extraction vehicle is within a communicable distance from the seismic data acquisition unit or once a communication link has been established with the seismic data acquisition unit. The extraction vehicle can provide the reference pressure data measured while the distance is less than the threshold to the seismic data acquisition unit for calibration. By measuring, identifying, detecting, or obtaining reference data based on the distance threshold, the system can facilitate calibrating the local sensor of the seismic data acquisition unit. For example, if the distance is greater than the threshold, the reference data may not be indicative of the pressure at the seismic data acquisition unit.

In some cases, the system can include other types of sensors. The system can be configured to calibrate one or more types of sensors. For example, the seismic data acquisition unit can include a gravimetric sensor. The system can retrieve the one or more pressure values calibrated based on the reference pressure data determined by the extraction vehicle. The system can determine, based on the one or more pressure values and historical tidal conditions, a depth of the seismic data acquisition unit. The system can determine the depth by accounting for tidal conditions which can affect the pressure detected by the pressure data. Accounting for the tidal conditions can include, for example, removing or adjusting pressure values corresponding to tidal conditions that can affect the pressure detected on the seabed by the pressure sensor. The system can then calibrate gravimetric data detected by the gravimetric sensor based on the one or more pressure values. In some cases, the system can determine a subsidence value (e.g., a caving in, or sinking, or compaction of an area on the seabed or subsurface on which the seismic data acquisition unit is placed) based on at least one of the determined depth or the calibrated gravimetric data.

Figure 8:
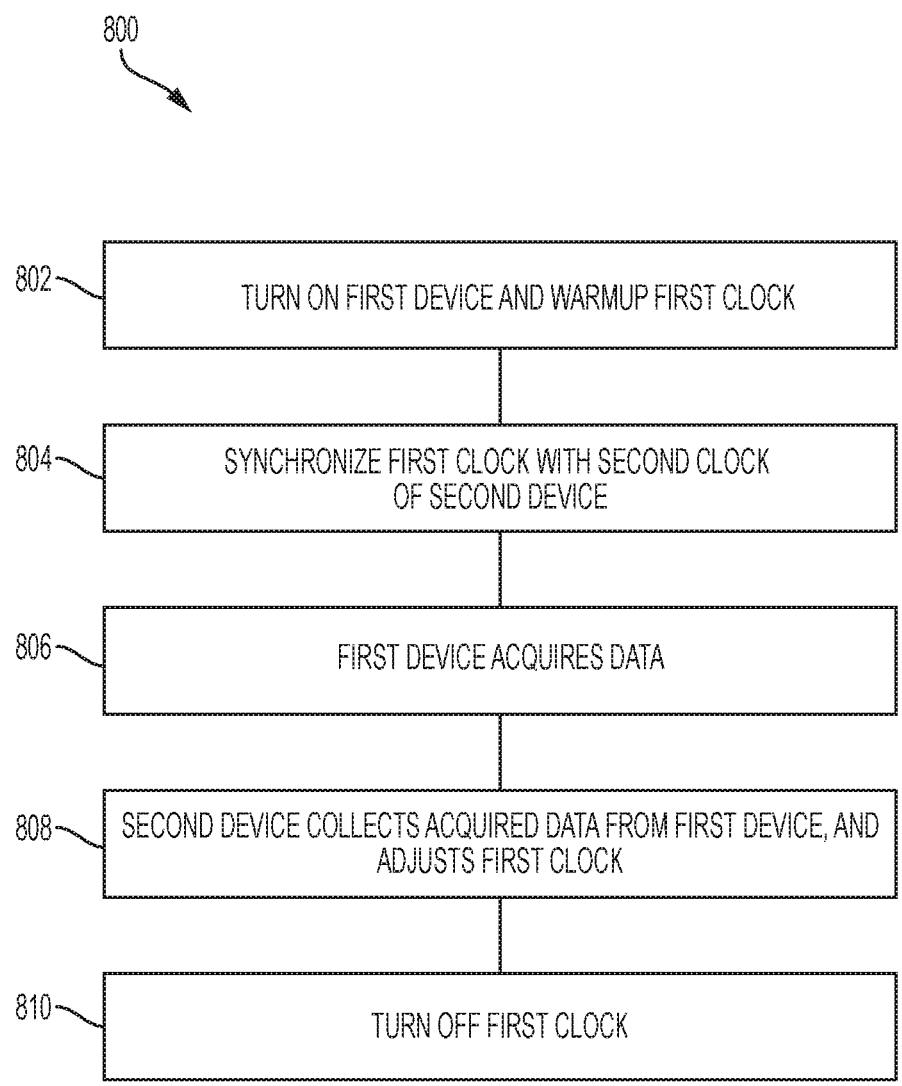
FIG. 8 is a block diagram depicting a method for adjusting a sensor via an optical link, according to an illustrative implementation.

FIG. 8 is a block diagram depicting a method for adjusting a clock or other sensor via an optical link. The method 800 can be performed by one or more system, component or module depicted in FIG. 1, 2, or 6. The sensor can include a clock, pressure sensor transducer, gravity sensor, or other sensor. Adjusting the sensor can include calibration, synchronization, syntonization, or other adjustment. The order in which the system calibrates, synchronizes, syntonizes or otherwise adjusts the sensor can improve the efficiency of the adjustment process and system. For example, the method 800 can include turning on the first device (e.g., seismic data acquisition unit) and warming up the first clock (or other first sensor) at 802. At 804, the method 800 includes synchronizing the first clock (or other first sensor) with a second clock (or other second sensor of a same type of sensor as the first sensor) of a second device (e.g., ROV). At 806, the method 800 includes the first device acquiring or detecting data. At 808, the method 800 includes the second device collecting the acquired data from the first device, and adjusting the first clock. At 810, the method 800 includes turning off the first clock.

The order in which the system synchronizes, syntonizes, or otherwise calibrates the clocks can improve the efficiency of the calibration process. For example, calibrating (or syntonizing) the local clock can take on the order of one or more minutes, whereas synchronizing the clock can take less than 2 or 3 seconds. Since drifting away from calibration is a function of operation, the clock may not drift as much when the clock is shut down, as compared to the amount of drift when the clock is running. After the clock shuts down, the clock may take several seconds to warm up before the clock can operate properly and reliably. Based on this, the systems and methods of the present disclosure can improve the synchronization and calibration process to make it more efficient.

To improve the efficiency of the clock synchronization and calibration process, the first device can turn on and warm up the clock at 802. Warming up the clock can take a predetermined amount of time, such as 1 second, 2 seconds, 3 seconds, 10 seconds, 30 seconds, 1 minute or more. In some cases, the system can detect when the clock is warmed based on a temperature of the clock or performance of the clock (e.g., the frequency of oscillations of the clock is stable to within a tolerance of 2 cycles per second).

At 804, the first device can synchronize the clock with the second device and project a time drift for the clock based on a model. The projected time drift (e.g., time variation function) can be a function of time, temperature, or other environmental parameters. For example, the time variation function can indicate a drift of one or more cycles per unit time based on the current temperature (e.g., one or more cycles per minute, one or more cycles per 2 minutes, one or more cycles per 5 minutes, one or more cycles per hour, or one or more cycles per day).

At 806, the first device can then begin acquiring seismic data. For example, an acoustic source can transmit an acoustic signal that can reflect off of subsurface lithological formations. The first device can include a geophone to receive the reflected acoustic signals, which can be referred to as seismic data. The first device can collect other types of data depending on the type of sensor, such as pressure data. The first device can apply the model for the projected time drift for the clock to the collected data to correct the time stamps in the collected data. For example, the first clock can drift in frequency from a beginning of the seismic data collection to the end of the seismic data collection. The first device can apply the correction model to the collected data or as the data is being collected and recorded. For example, the first device can adjust or correct the time stamps corresponding to the samples of seismic data as the samples are detected and recorded.

At 808, the second device can collect the data acquired by the first device from the first device. At 808, the second device can also adjust the first clock of the first device. For example, the second device can include an ROV that is sent down to collect data from the seismic data acquisition unit (e.g., first device). Since collecting the seismic data can take several minutes, the ROV can adjust, synchronize, syntonize or otherwise calibrate the first clock while collecting the seismic data to save resources (e.g., time, energy, battery power, or other resource utilization). Collecting data by the ROV from the seismic data acquisition unit can at least partially overlap with calibration or syntonization. Since syntonizing the clock can take several seconds or minutes, the system can improve efficiency of overall clock calibration by performing syntonization while collecting data, which can also take several seconds or minutes.

At 810, the first device can turn off or turn off the first clock. For example, after the ROV collects the data and calibrates the first clock on the seismic data acquisition unit, the seismic data acquisition unit can turn off, enter a standby mode, or enter a low power mode. One more component of the seismic data acquisition unit can turn off, enter a standby mode, or enter a low power mode. For example, the clock can turn off or enter a standby mode to reduce or minimize the amount of frequency drift as compared to the amount of frequency drift when the clock is operational. The system can repeat the process of blocks 802-810 for one or more seismic data acquisition units on the seabed.

Figure 9:
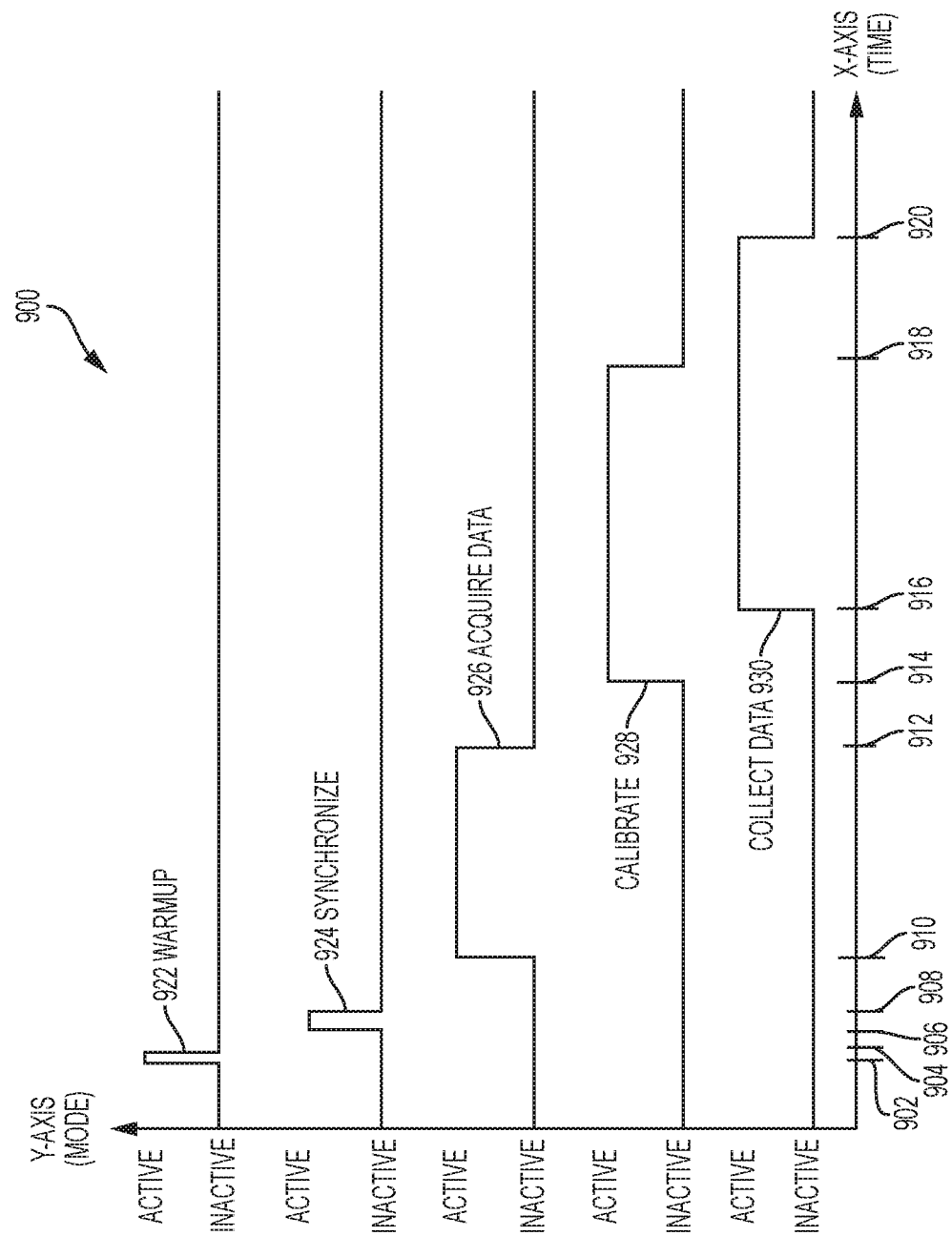
FIG. 9 is a chart depicting timing windows for synchronization and syntonization, according to an illustrative implementation.

FIG. 9 is a chart depicting timing windows for synchronization and syntonization in accordance with the method 800 depicted in FIG. 8. As illustrated in chart 900, the pulse 922 indicates when the clock (or other sensor) warms up. Warmup can begin at time 902 and complete at time 904. The pulse 924 indicates synchronization of the clock. The clock can begin the synchronization process at time 906, and complete synchronization at time 908. For example, the ROV can approach the clock to synchronize the clock during time interval 906 to 908. After synchronization 924 completes at time 906, the ROV can distance itself from the clock, or return to a marine vessel.

During time interval 910 to 912, the seismic data acquisition unit comprising the clock can acquire data 926. For example, shot sources can transmit acoustic signals that reflect off of various subsurface features, and the seismic data can record these reflected signals. After seismic data acquisition completes at time 912, the ROV can approach the seismic data acquisition unit to begin either collecting data at 930 or calibrating the clock at 928, or both. The calibration 928 can begin first, or the collecting of data 930 can begin first. The calibration 928 can overlap with the data collection 930. In some cases, clock calibration (e.g., synchronization or syntonization) can begin at time 914 and complete at time 918. In some cases, data collection can begin at time 916 and complete at time 920. Data collection can end before or after calibration completes. For example, by separating synchronization and syntonization, the system can improve operational efficiency because synchronization can be performed using the distance between the seismic data acquisition unit and the ROV.

Figure 10:
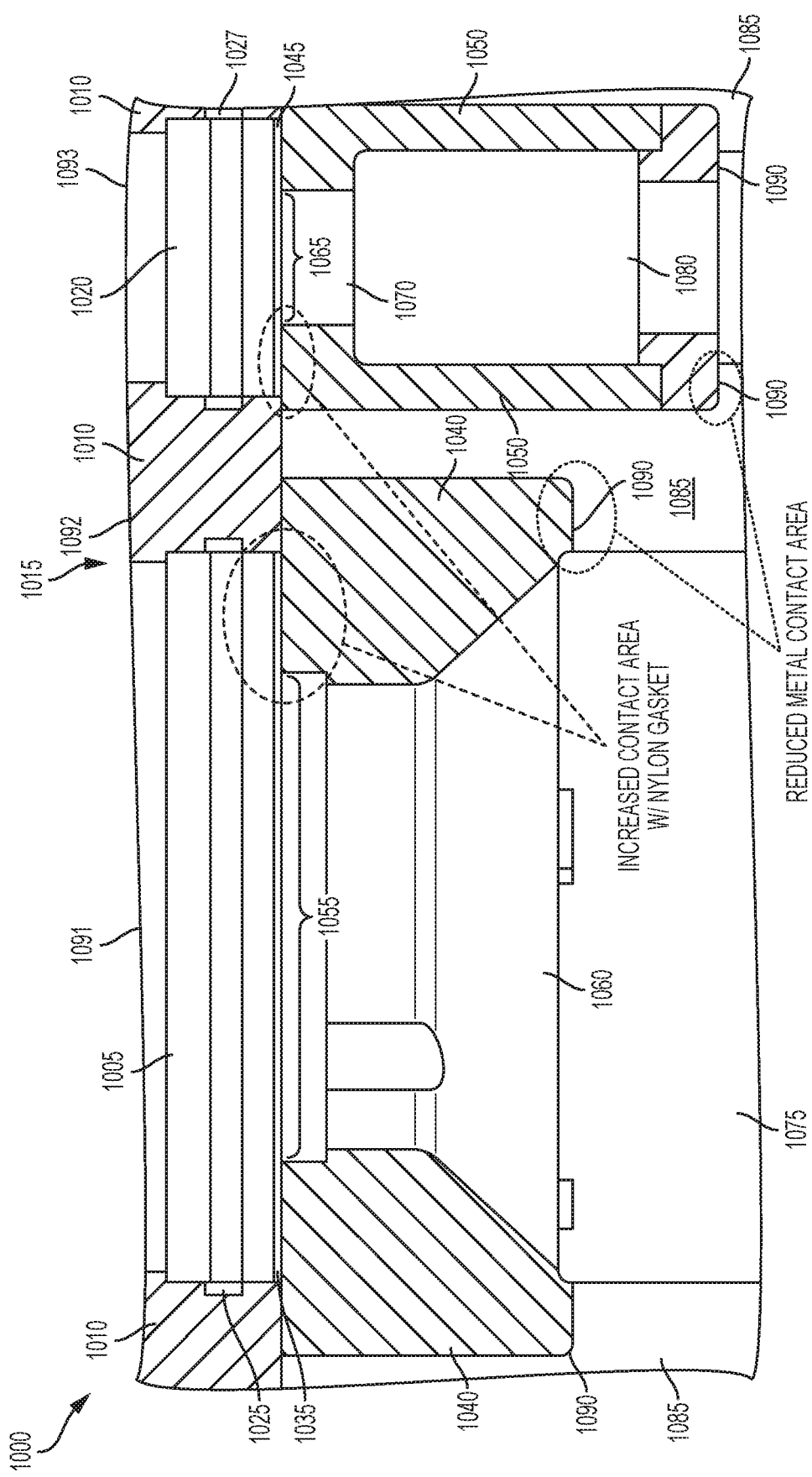
FIG. 10 is a diagram depicting a seismic survey device including an optical window according to an illustrative implementation.

FIG. 10 depicts a cross section of a portion of a device 1000 associated with seismic surveys. The device 1000 can include a seismic data acquisition unit (e.g., first device 102 depicted in FIG. 1) or an extraction vehicle (e.g., second device 104 depicted in FIG. 1). For example, the device 1000 that includes a seismic data acquisition unit can have at least one receiver window 1005 disposed in a lid 1010 on a top surface 1015 of the seismic data acquisition unit. The top surface 1015 is generally the surface that faces up, toward the surface of a body of water then the seismic data acquisition unit is disposed on a seabed or other surface of the earth. The device 1000 can also include at least one transmitter window 1020 disposed in the lid 1010. The receiver window 1005 and the transmitter window 1020 can also be disposed in other areas of the device 1000, such as lateral walls, or in the case of an extraction vehicle, a bottom surface so that the windows face downward toward the seismic data acquisition units disposed on the seabed during operation. The device 1000 can include at least one seal 1025 positioned at the transmitter window 1020. The at least one seal 1025 can include an O-ring (or other gasket, radial, backer, or mechanical seal). The device 1000 can include at least one seal 1027 at the receiver window. The at least seal 1027 can include an O-ring (or other gasket, radial, backer, or mechanical seal).

The device 1000 can include a first gasket 1045 between the transmitter window 1020 and the first aperture 1070. The first gasket 1045 can provide a clearance between the transmitter window 1020 and the first aperture 1070 that is greater than a threshold to allow the transmitter window 1020 to move, deform, expand or contract under pressure in order to reduce impingement and cracking of the transmitter window 1020. The device 1000 can include a second gasket 1035 between the receiver window 1005 and the second aperture 1060 that provides a clearance greater than the threshold to allow the receiver window 1005 to move, deform, expand or contract under pressure in order to reduce impingement and cracking of the receiver window 1005.

At least a portion of the second gasket 1035 positioned at the receiver window 1005 can be supported by support piece 1040. At least a portion of the first gasket 1045 positioned at the transmitter window 1020 can be supported by support piece 1050. The central region 1055 of the receiver window 1005 can be disposed over or on top of an aperture 1060. The central region 1065 of the transmitter window 1020 can be disposed over or on top of an aperture 1070. At least one receiver 1075 (e.g., an optical receiver) can receive an optical transmission that enters the device 1000, passing through the central region 1055 of the received window 1005 and the aperture 1060. At least one transmitter (e.g., an optical transmitter) 1080 can transmit an optical transmission through the aperture 1070, through the central region 1065 of the transmitter window 1020 and out from the device 1000 into a fluid medium such as water. The device 1000 can include a case 1085. The case can at least partially support the support piece 1040 or the support piece 1050 at contact points 1090. The contact points 1090 can include metal-to-metal (or other material) contacts between the support piece 1040 (or the support piece 1050) and the case 1085.

Figure 11:
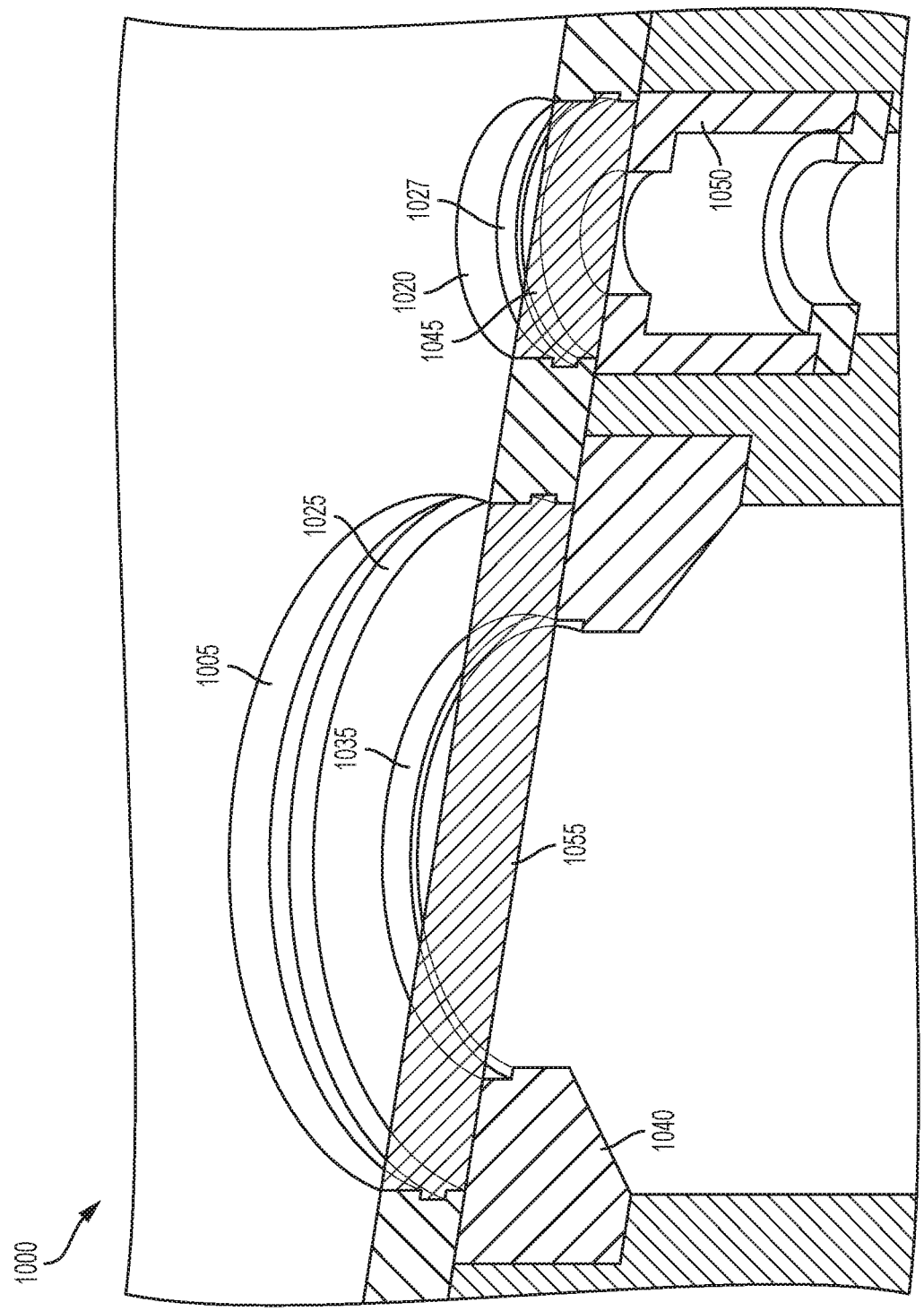
FIG. 11 is a diagram depicting a seismic survey device including an optical window according to an illustrative implementation.
Figure 12:
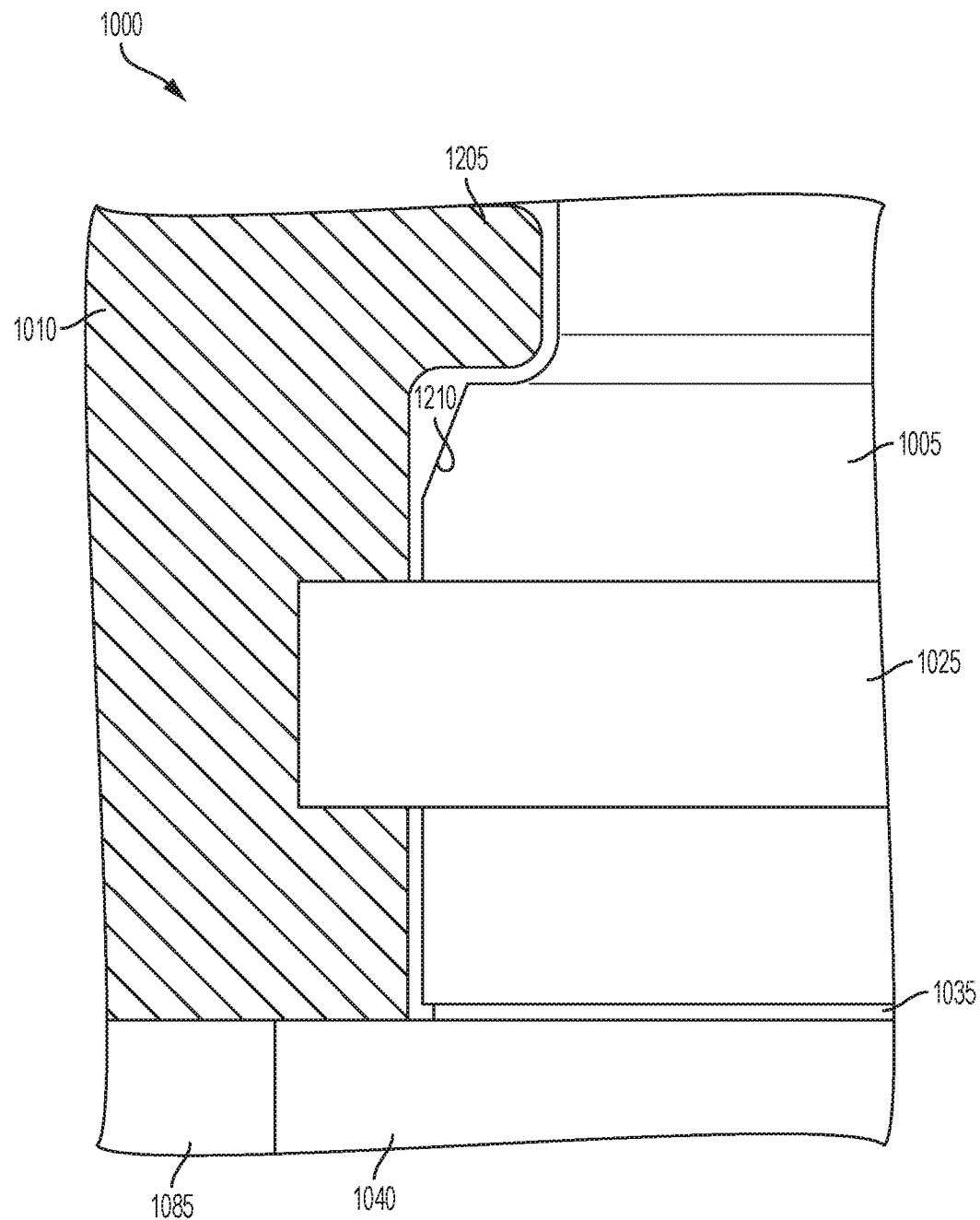
FIG. 12 is a seismic survey device including an optical window according to an illustrative implementation.

Referring to FIG. 10, FIG. 11, and FIG. 12, among others, the contact points between the support piece 1040 (or the support piece 1050) and the case 1085 can be less than, or reduced relative to, contact points between the second gasket 1035 and the receiver window 1005, or between the first gasket 1045 and the transmitter window 1020. For example, metal-to-metal contact can be avoided by a gasket 1035. The gasket 1035 can include a nylon gasket, or other material. The gasket 1035 can be disposed between a bottom or inner surface of the receiver window 1005 and the support piece 1040. The gasket 1035 can also be disposed between a bottom or inner surface of the transmitter window 1020 and the support piece 1050. FIG. 12 and the other FIGS. are not necessarily to scale, as for example the outer surface 1091 of the receiver window 1005, the outer surface 1092 of the lid 1010, and the outer surface 1093 of the transmitter window 1020 can be flush or co-planar. The gasket 1035 can physically touch or contact the receiver window 1005 and the support piece 1040. Another gasket 1045 can physical touch or contact the transmitter window 1020 and the support piece 1050.

FIG. 12 depicts the receiver window 1005 sealed by seal 1025 (e.g., an O-ring) and engaged or in contact with the lid 1010. The transmitter window 1020 can have a similar configuration with seal 1027. The lid 1010 (e.g., a top of a seismic data acquisition unit) can include at least one lip 1205. The receiver window 1005 can include a chamfer 1210. The chamfer 1205 can be configured to avoid interference with the seal 1025 of the receiver window 1005 (or of the transmitter window 1020) during installation or coupling of the receiver window 1005 or transmitter window 1020 into or with the lid 1010.

The device 1000 can include optical clear windows that can pass optical (or other) data transmissions in a high pressure environment, such as on a seabed or at or near the bottom of a water column. The systems and methods described herein provide optically clear windows 1005, 1020 in the device 1000 for optical (or other) data communication link transmissions between, for example a seismic data acquisition unit and an extraction vehicle. In this example, each of these devices can include the windows 1005, 1020. The device 1000 can be subject to high pressure conditions, e.g., on a seabed hundreds, thousands or more feet beneath the water surface. The windows 1005, 1020 can provide transmissivity at an appropriate wavelength for optical transmission (e.g., 400-550 nm or another range). For example the optical transmissions can occur at a wavelength of substantially (e.g., +/−10%) 405 nm, or substantially (e.g., +/−10%) 450 nm. The windows 1005, 1020 can also provide the necessary mechanical strength to maintain their integrity under high pressure conditions. The windows 1005, 1020 can be made of, for example, industrial sapphire. The windows 1005, 1020 can be back mounted into the lid 1010 and sealed with the O-ring 1025 during assembly of the device 1000, sufficient to handle sea-bed pressure conditions. This mechanical mounting solution accounts for the relative brittleness of sapphire (or other materials) relative to the materials of the lid and case such as aluminum (or other materials).

The structural disposition of the windows 1005, 1020 in the lid 1010 can result in a flush or co-planar outer surface of the device 1000 (e.g., the top of a seismic data acquisition unit or the bottom of an extraction vehicle). This flush or co-planar surface can minimize crevasses or protrusions on the device 1000 and can prevent the buildup of particles and marine growth. On a seismic data acquisition unit or other device 1000, the flushness between the outer surface 1091 of the receiver window 1005, the outer surface 1092 of the lid 1010, and the outer surface 1093 of the transmitter window 1020 can allow for a suction based system of seismic data acquisition unit deployment. For example, a suction device can attach to the top surface of the seismic data acquisition unit to move the unit, e.g., from a first position to a second position on a vessel, or from a storage basket or tray to the seabed in the water column. The flushness of the top surface can prevent the suction based seal from slipping, not occurring, or coming undone.

The lid 1010 can include at least one pocket or open area into which the windows 1005, 1020 can be inserted during assembly of the device 1000. The lip 1205 in combination with a matching feature (e.g., protrusion) of the window 1005, 1020 can retain the window 1005, 1020 in the pocket of the lid 1010, and allows for installation from the rear, (e.g., back or inside) of the lid 1010. A seal 1025 or 1027, such as a radial seal or an O-ring, can seal the window 1005, 1020, respectively, with the lid 1010 without requiring mounting hardware, and can create friction sufficient to restrain the window 1005, 1020 from falling out of position during installation. The chamfer 1210 at the edges of the window 1005, 1020 below the lip 1205 accommodates use of the O-ring 1025. The chamfer 1210 allows for installation of the window 1005, 1020 without rolling or interfering with the seal 1025 or 1027.

The gasket between the windows 1005, 1020 and the lid 1010 (or similar element on an extraction vehicle) can accommodate external high pressure while eliminating aluminum (or other material) impingement, which may result in cracking or fracturing of the windows 1005, 1020. For example, the clearances can be larger than normal manufacturing tolerances, such as 0.001 inches, 0.002 inches, 0.003 inches, 0.004 inches, 0.005 inches, 0.007 inches, 0.008 inches, or 0.009 inches or more. This allows the lid 1010 and surrounding structure to move or float under high pressures present at, for example, ocean depth without compromising the windows 1005, 1020, gaskets 1035 or 1045, or the seal created by the O-ring 1025. This also allows for ocean pressure to equalize around the lid lip 1205, which can minimize movement of the lip 1205.

Thus, the gaskets 1035 and 1045 between windows 1005, 1020, respectively, and the lid 1010 can provide a floating feature for the lid 1010 and surrounding structures. For example, the floating feature can refer to an internal structure (such as a window or a sapphire window), not being rigidly or firmly fixed in a surrounding structure (such as a frame or metallic frame). Rather, the window can be held in place with an assembly of gasketing. A gasket 1035 or 1045 can include a mechanical seal that can fill the space between two or more mating surfaces or structures (such as the internal structure and the surrounding structure). The gaskets 1035 and 1045 can be compressible or undergo deformation. The gaskets 1035 and 1045 can compress or deform at a rate or amount different from the surround structures or at different pressures or different temperatures. A rate of deformation can refer to an amount of deformation based on a certain pressure or temperature. The gaskets 1035 and 1045 can be more compressible than structures such as the window itself or the metallic frame that surrounds the window. The surrounding structures such as the windows 1005 or 1020 and the metallic frame forming the lid 1010 may be less compressible than the gasket, although they may experience some compression or deformation at some depths due to pressure or temperature. The different structures may compress at a different rate relative to each of the structures. For example, the window 1005 or 1020 may compress or deform at a different rate or a different amount than the metallic frame if the lid 1010. Since this difference in compressibility may cause a surrounding structure (e.g., metallic frame of the lid 1010) to compress more quickly than an internal structure (e.g., sapphire window 1005 or 1020), the resulting force exerted by the surrounding structure on the internal structure can cause the internal structure to break. By floating the internal structure with a gasket 1035 or 1045, the increased compression of the surrounding structure can be absorbed by the gasket 1035 or 1045 as the gasket compresses without putting excess force on the internal structure, thereby preventing the internal structure from breaking. Thus, floating the window can prevent the impingement of the surrounding material.

The device 1000 can provide for structural support of the windows 1005, 1020 over a larger opening in the case 1085 than the window diameter. Support pieces 1040, 1050 below the windows can be sized to reduce contact stresses on the windows 1005, 1020, and to transfer those stresses into a smaller metal shelf (e.g., at contact points 1090). The gasket 1035 (e.g., a nylon gasket) can be placed beneath the bottom surface of the windows 1005, 1020 to provide a thin layer of malleable material that can mask surface roughness of the metal (e.g., the top of support pieces 1040, 1050) and to make contact stress across the area between the windows 1005, 1020 (e.g., at the gaskets 1035, 1045) more uniform.

The windows 1005, 1020 and the lid 1010 can be substantially (e.g., +/−10%) 0.5 inches thick. In some implementations, the lid 1010 is thicker than the windows 1005, 1020. For example, the lid 1010 can be 0.5 inches thick, and the windows 1005, 1020 can be 0.48 inches thick. The receiver window 1005 can have a larger diameter than the transmitter window. For example, the receiver window 1005 can have a diameter of substantially (+/−10%) 3 inches, and the transmitter window 1020 can have a diameter of substantially (+/−10%) 1⅛ inches. For example, the receiver window 1005 can be 3 inches in diameter, with the two central inches (e.g., a one inch radius from the central point) forming the central region 1055, and the outer ½ inch of the receiver window 1005 forming the peripheral region 1035. The transmitter window 1020 can be proportionally similarly arranged. In some example, at their closest point on the device 1000, the receiver window 1005 and the transmitter window 1020 can be separated by 1 inch, +/−10%, with a portion of the lid 1010 separating the windows 1005, 1020. The lid 1010 can have a diameter of 19 inches (+/−10%) or another diameter greater or less than 10 inches. These dimensions are all examples and other dimensions greater or less than these dimensions are possible.

Figure 13:
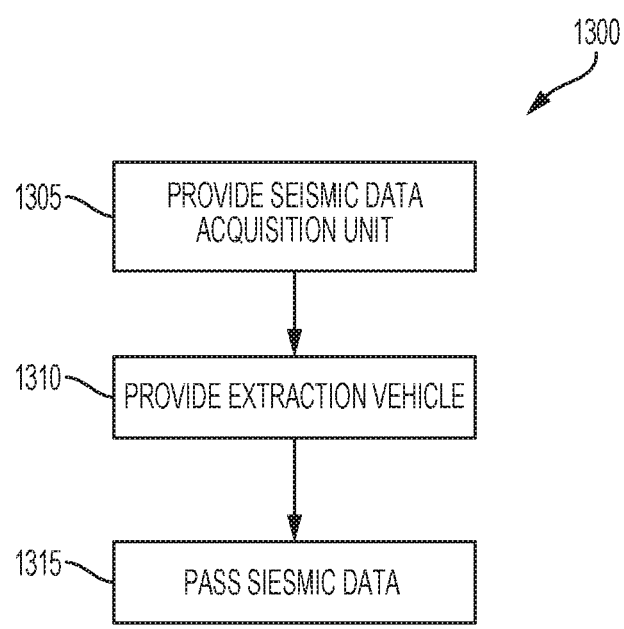
FIG. 13 is a method according to an illustrative implementation.

FIG. 13 illustrates a method 1300. The method 1300 can be part of a seismic data acquisition method associate with a seismic survey. The method 1300 can include providing a seismic data acquisition unit (ACT 1305). The seismic data acquisition unit can include the device 1000 described herein and can have a transmitter window disposed in a first aperture of a lid, and a receiver window disposed in a second aperture of the lid. The method 1300 can also include providing an extraction vehicle (ACT 1310). The extraction vehicle can include the device 1000 described herein and can have at least one of a transmitter window and a receiver window. The method 1300 can include passing optical or electromagnetic communications between the seismic data acquisition unit and the extraction vehicle via at least one of the transmitter window and the receiver window of the seismic data acquisition unit and the transmitter window and the receiver window of the extraction vehicle (ACT 1315). For example, the seismic data acquisition unit and the extraction vehicle can establish an optical (or other) data communications link. Data transmitted via this link can pass through the windows 1005, 1020 of the respective devices 1000. The method 1300 can include passing optical or electromagnetic communications to or from an extraction vehicle via at least one of a transmitter window and a receiver window of the extraction vehicle, via at least one of the transmitter window and the receiver window of the seismic data acquisition unit.

In some case, at ACT 1305, the method 1300 can include providing a seismic data acquisition unit having a transmitter window disposed in a first aperture of a lid, and a receiver window disposed in a second aperture of the lid. The method 1300 can include providing an interface between the transmitter window and the first aperture comprising a gasket configured to seal the transmitter window and provide a clearance greater than a threshold to allow the transmitter window to move under pressure to reduce impingement and cracking of the transmitter window. The method 1300 can include providing an interface between the receiver window and the second aperture comprising a gasket configured to seal the receiver window and provide clearance greater than the threshold to allow the receiver window to move under pressure to reduce impingement and cracking of the receiver window.

Figure 14:
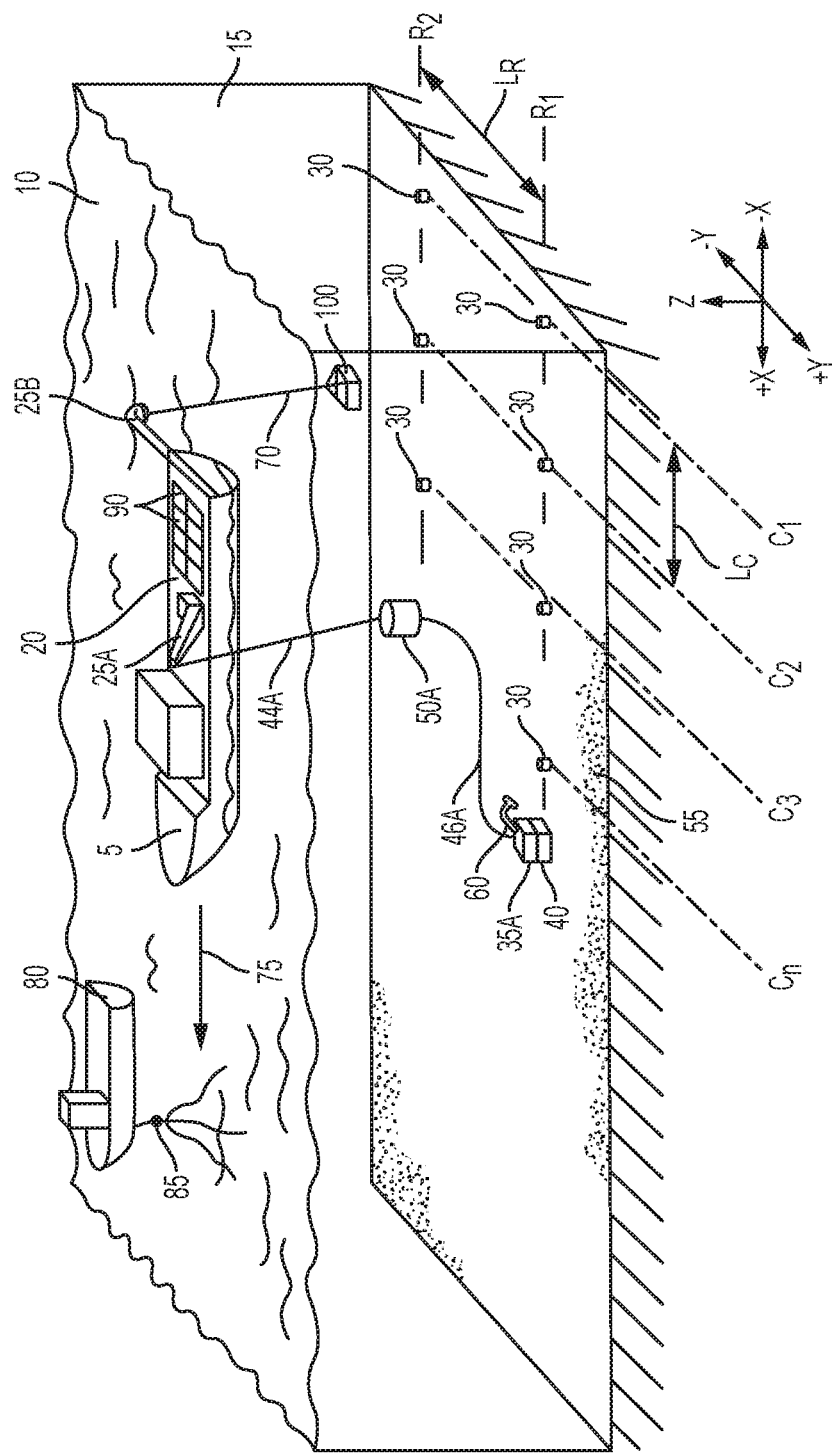
FIG. 14 depicts an isometric schematic view of an example of a seismic operation in deep water.

FIG. 14 is an isometric schematic view of an example of a seismic operation in deep water facilitated by a first marine vessel 5. FIG. 14 is a non-limiting illustrative example of a marine environment in which the systems and methods of the present disclosure can perform a seismic survey or calibrate a geophone and hydrophone pair.

By way of example, FIG. 14 illustrates a first vessel 5 positioned on a surface 10 of a water column 15 and includes a deck 20 which supports operational equipment. At least a portion of the deck 20 includes space for a plurality of sensor device racks 90 where seismic sensor devices (e.g., first device 102) are stored. The sensor device racks 90 may also include data retrieval devices or sensor recharging devices.

The deck 20 also includes one or more cranes 25A, 25B attached thereto to facilitate transfer of at least a portion of the operational equipment, such as an ROV (e.g., second device 104) or seismic sensor devices, from the deck 20 to the water column 15. For example, a crane 25A coupled to the deck 20 is configured to lower and raise an ROV 35A, which transfers and positions one or more sensor devices 30 on a seabed 55. The seabed 55 can include a lakebed 55, ocean floor 55, or earth 55. The ROV 35A is coupled to the first vessel 5 by a tether 46A and an umbilical cable 44A that provides power, communications, and control to the ROV 35A. A tether management system (TMS) 50A is also coupled between the umbilical cable 44A and the tether 46A. The TMS 50A may be utilized as an intermediary, subsurface platform from which to operate the ROV 35A. For most ROV 35A operations at or near the seabed 55, the TMS 50A can be positioned approximately 50 feet above seabed 55 and can pay out tether 46A as needed for ROV 35A to move freely above seabed 55 in order to position and transfer seismic sensor devices 30 thereon.

A crane 25B may be coupled (e.g., via a latch, anchor, nuts and bolts, screw, suction cup, magnet, or other fastener) to a stern of the first vessel 5, or other locations on the first vessel 5. Each of the cranes 25A, 25B may be any lifting device or launch and recovery system (LARS) adapted to operate in a marine environment. The crane 25B can be coupled to a seismic sensor transfer device 100 by a cable 70. The transfer device 100 may be a drone, a skid structure, a basket, or any device capable of housing one or more sensor devices 30 therein. The transfer device 100 may be a structure configured as a magazine adapted to house and transport one or more sensor devices 30. The transfer device 100 may include an on-board power supply, a motor or gearbox, or a propulsion system 105. The transfer device 100 can be configured as a sensor device storage rack for transfer of sensor devices 30 from the first vessel 5 to the ROV 35A, and from the ROV 35A to the first vessel 5. The transfer device 100 may include an on-board power supply, a motor or gearbox, or a propulsion system 105. Alternatively, the transfer device 100 may not include any integral power devices or not require any external or internal power source. The cable 70 can provide power or control to the transfer device 100. Alternatively, the cable 70 may be an umbilical, a tether, a cord, a wire, a rope, and the like, that is configured solely for support of the transfer device 100.

The ROV 35A can include a seismic sensor device storage compartment 40 that is configured to store one or more seismic sensor devices 30 (e.g., first devices 102) therein for a deployment or retrieval operation. The storage compartment 40 may include a magazine, a rack, or a container configured to store the seismic sensor devices. The storage compartment 40 may also include a conveyor, such as a movable platform having the seismic sensor devices thereon, such as a carousel or linear platform configured to support and move the seismic sensor devices 30 therein. The seismic sensor devices 30 can be deployed on the seabed 55 and retrieved therefrom by operation of the movable platform. The ROV 35A may be positioned at a predetermined location above or on the seabed 55 and seismic sensor devices 30 are rolled, conveyed, or otherwise moved out of the storage compartment 40 at the predetermined location. The seismic sensor devices 30 can be deployed and retrieved from the storage compartment 40 by a robotic device 60, such as a robotic arm, an end effector or a manipulator, disposed on the ROV 35A.

The seismic sensor device 30 may be referred to as seismic data acquisition unit 30 or node 30 or first device 102. The seismic data acquisition unit 30 can record seismic data. The seismic data acquisition unit 30 may include one or more of at least one geophone, at least one hydrophone, at least one power source (e.g., a battery, external solar panel), at least one clock, at least one tilt meter, at least one environmental sensor, at least one seismic data recorder, at least global positioning system sensor, at least one wireless or wired transmitter, at least one wireless or wired receiver, at least one wireless or wired transceiver, or at least one processor. The seismic sensor device 30 may be a self-contained unit such that all electronic connections are within the unit, or one or more components can be external to the seismic sensor device 30. During recording, the seismic sensor device 30 may operate in a self-contained manner such that the node does not require external communication or control. The seismic sensor device 30 may include several geophones and hydrophones configured to detect acoustic waves that are reflected by subsurface lithological formation or hydrocarbon deposits. The seismic sensor device 30 may further include one or more geophones that are configured to vibrate the seismic sensor device 30 or a portion of the seismic sensor device 30 in order to detect a degree of coupling between a surface of the seismic sensor device 30 and a ground surface. One or more component of the seismic sensor device 30 may attach to a gimbaled platform having multiple degrees of freedom. For example, the clock may be attached to the gimbaled platform to minimize the effects of gravity on the clock.

For example, in a deployment operation, a first plurality of seismic sensor devices, comprising one or more sensor devices 30, may be loaded into the storage compartment 40 while on the first vessel 5 in a pre-loading operation. The ROV 35A, having the storage compartment coupled thereto, is then lowered to a subsurface position in the water column 15. The ROV 35A utilizes commands from personnel on the first vessel 5 to operate along a course to transfer the first plurality of seismic sensor devices 30 from the storage compartment 40 and deploy the individual sensor devices 30 at selected locations on the seabed 55. Once the storage compartment 40 is depleted of the first plurality of seismic sensor devices 30, the transfer device 100 is used to ferry a second plurality of seismic sensor devices 30 as a payload from first vessel 5 to the ROV 35A.

The transfer system 100 may be preloaded with a second plurality of seismic sensor devices 30 while on or adjacent the first vessel 5. When a suitable number of seismic sensor devices 30 are loaded onto the transfer device 100, the transfer device 100 may be lowered by crane 25B to a selected depth in the water column 15. The ROV 35A and transfer device 100 are mated at a subsurface location to allow transfer of the second plurality of seismic sensor devices 30 from the transfer device 100 to the storage compartment 40. When the transfer device 100 and ROV 35A are mated, the second plurality of seismic sensor devices 30 contained in the transfer device 100 are transferred to the storage compartment 40 of the ROV 35A. Once the storage compartment 40 is reloaded, the ROV 35A and transfer device 100 are detached or unmated and seismic sensor device placement by ROV 35A may resume. Reloading of the storage compartment 40 can be provided while the first vessel 5 is in motion. If the transfer device 100 is empty after transfer of the second plurality of seismic sensor devices 30, the transfer device 100 may be raised by the crane 25B to the vessel 5 where a reloading operation replenishes the transfer device 100 with a third plurality of seismic sensor devices 30. The transfer device 100 may then be lowered to a selected depth when the storage compartment 40 is reloaded. This process may repeat as until a desired number of seismic sensor devices 30 have been deployed.

Using the transfer device 100 to reload the ROV 35A at a subsurface location reduces the time required to place the seismic sensor devices 30 on the seabed 55, or "planting" time, as the ROV 35A is not raised and lowered to the surface 10 for seismic sensor device reloading. The ROV 35A can synchronize a clock of the node 30 at the time of planting. Further, mechanical stresses placed on equipment utilized to lift and lower the ROV 35A are minimized as the ROV 35A may be operated below the surface 10 for longer periods. The reduced lifting and lowering of the ROV 35A may be particularly advantageous in foul weather or rough sea conditions. Thus, the lifetime of equipment may be enhanced as the ROV 35A and related equipment are not raised above surface 10, which may cause the ROV 35A and related equipment to be damaged, or pose a risk of injury to the vessel personnel.

Likewise, in a retrieval operation, the ROV 35A can utilize commands from personnel on the first vessel 5 to retrieve each seismic sensor device 30 that was previously placed on seabed 55, or collect data from the seismic sensor device 30 without retrieving the device 30. The ROV 35A can adjust the clock of the device 30 while collecting the seismic data. The retrieved seismic sensor devices 30 are placed into the storage compartment 40 of the ROV 35A. In some implementations, the ROV 35A may be sequentially positioned adjacent each seismic sensor device 30 on the seabed 55 and the seismic sensor devices 30 are rolled, conveyed, or otherwise moved from the seabed 55 to the storage compartment 40. The seismic sensor devices 30 can be retrieved from the seabed 55 by a robotic device 60 disposed on the ROV 35A.

Once the storage compartment 40 is full or contains a pre-determined number of seismic sensor devices 30, the transfer device 100 is lowered to a position below the surface 10 and mated with the ROV 35A. The transfer device 100 may be lowered by crane 25B to a selected depth in the water column 15, and the ROV 35A and transfer device 100 are mated at a subsurface location. Once mated, the retrieved seismic sensor devices 30 contained in the storage compartment 40 are transferred to the transfer device 100. Once the storage compartment 40 is depleted of retrieved sensor devices, the ROV 35A and transfer device 100 are detached and sensor device retrieval by ROV 35A may resume. Thus, the transfer device 100 is used to ferry the retrieved seismic sensor devices 30 as a payload to the first vessel 5, allowing the ROV 35A to continue collection of the seismic sensor devices 30 from the seabed 55. In this manner, sensor device retrieval time is significantly reduced as the ROV 35A is not raised and lowered for sensor device unloading. Further, safety issues and mechanical stresses placed on equipment related to the ROV 35A are minimized as the ROV 35A may be subsurface for longer periods.

For example, the first vessel 5 can travel in a first direction 75, such as in the +X direction, which may be a compass heading or other linear or predetermined direction. The first direction 75 may also account for or include drift caused by wave action, current(s) or wind speed and direction. The plurality of seismic sensor devices 30 can be placed on the seabed 55 in selected locations, such as a plurality of rows Rn in the X direction (R1 and R2 are shown) or columns Cn in the Y direction (C1-Cn are shown), wherein n equals an integer. The rows Rn and columns Cn can define a grid or array, wherein each row Rn (e.g., R1-R2) comprises a receiver line in the width of a sensor array (X direction) or each column Cn comprises a receiver line in a length of the sensor array (Y direction). The distance between adjacent sensor devices 30 in the rows is shown as distance LR and the distance between adjacent sensor devices 30 in the columns is shown as distance LC. While a substantially square pattern is shown, other patterns may be formed on the seabed 55. Other patterns include non-linear receiver lines or non-square patterns. The pattern(s) may be pre-determined or result from other factors, such as topography of the seabed 55. The distances LR and LC can be substantially equal and may include dimensions between about 60 meters to about 400 meters, or greater. The distance between adjacent seismic sensor devices 30 may be predetermined or result from topography of the seabed 55 as described above.

The first vessel 5 is operated at a speed, such as an allowable or safe speed for operation of the first vessel 5 and any equipment being towed by the first vessel 5. The speed may take into account any weather conditions, such as wind speed and wave action, as well as currents in the water column 15. The speed of the vessel may also be determined by any operations equipment that is suspended by, attached to, or otherwise being towed by the first vessel 5. For example, the speed can be limited by the drag coefficients of components of the ROV 35A, such as the TMS 50A and umbilical cable 44A, as well as any weather conditions or currents in the water column 15. As the components of the ROV 35A are subject to drag that is dependent on the depth of the components in the water column 15, the first vessel speed may operate in a range of less than about 1 knot. In examples where two receiver lines (rows R1 and R2) are being laid, the first vessel includes a first speed of between about 0.2 knots and about 0.6 knots. In some implementations, the first speed includes an average speed of between about 0.25 knots, which includes intermittent speeds of less than 0.25 knots and speeds greater than about 1 knot, depending on weather conditions, such as wave action, wind speeds, or currents in the water column 15.

During a seismic survey, one receiver line, such as row R1 may be deployed. When the single receiver line is completed a second vessel 80 can be used to provide a source signal. In some cases, the first vessel or other device can provide the source signal. The second vessel 80 is provided with a source device or acoustic source device 85, which may be a device capable of producing acoustical signals or vibrational signals suitable for obtaining the survey data. The source signal propagates to the seabed 55 and a portion of the signal is reflected back to the seismic sensor devices 30. The second vessel 80 may be required to make multiple passes, for example at least four passes, per a single receiver line (row R1 in this example). During the time the second vessel 80 is making the passes, the first vessel 5 continues deployment of a second receiver line. However, the time involved in making the passes by the second vessel 80 is much shorter than the deployment time of the second receiver line. This causes a lag time in the seismic survey as the second vessel 80 sits idle while the first vessel 5 is completing the second receiver line.

The first vessel 5 can use one ROV 35A to lay sensor devices to form a first set of two receiver lines (rows R1 and R2) in any number of columns, which may produce a length of each receiver line of up to and including several miles. The two receiver lines (rows R1 and R2) can be substantially (e.g., within +/−10 degrees) parallel. When a single directional pass of the first vessel 5 is completed and the first set (rows R1, R2) of seismic sensor devices 30 are laid to a predetermined length, the second vessel 80, provided with the source device 85, is utilized to provide the source signal. The second vessel 80 can make eight or more passes along the two receiver lines to complete the seismic survey of the two rows R1 and R2.

While the second vessel 80 is shooting along the two rows R1 and R2, the first vessel 5 may turn 180 degrees and travel in the X direction in order to lay seismic sensor devices 30 in another two rows adjacent the rows R1 and R2, thereby forming a second set of two receiver lines. The second vessel 80 may then make another series of passes along the second set of receiver lines while the first vessel 5 turns 180 degrees to travel in the +X direction to lay another set of receiver lines. The process may repeat until a specified area of the seabed 55 has been surveyed. Thus, the idle time of the second vessel 80 is minimized as the deployment time for laying receiver lines is cut approximately in half by deploying two rows in one pass of the vessel 5.

Although only two rows R1 and R2 are shown, the sensor device 30 layout is not limited to this configuration as the ROV 35A may be adapted to layout more than two rows of sensor devices in a single directional tow. For example, the ROV 35A may be controlled to lay out between three and six rows of sensor devices 30, or an even greater number of rows in a single directional tow. The width of a "one pass" run of the first vessel 5 to layout the width of the sensor array can be limited by the length of the tether 46A or the spacing (distance LR) between sensor devices 30.

Any references to implementations or elements or acts of the systems and methods herein referred to in the singular can include implementations including a plurality of these elements, and any references in plural to any implementation or element or act herein can include implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementations," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Elements other than 'A' and 'B' can also be included.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system to perform a seismic survey in a marine environment, comprising:
   a seismic data acquisition unit placed on a seabed in the marine environment, the seismic data acquisition unit including a first clock;
   an extraction vehicle to establish an optical communications link with the seismic data acquisition unit, the extraction vehicle including a second clock, a transmitter, and a data processing system to:
      transmit, via the transmitter, to the seismic data acquisition unit, a reference pulse based on the second clock;
      syntonize, via the optical communications link, based on the transmitted reference pulse, a frequency of the first clock of the seismic data acquisition unit to a frequency of the second clock prior to the seismic data acquisition unit entering a low power state;
      receive a signal generated by the first clock from the seismic data acquisition unit responsive to syntonization of the frequency of the first clock to the frequency of the second clock, the signal indicating that the frequency of the first clock is syntonized with the frequency of the second clock;
      instruct the seismic data acquisition unit to enter the low power state responsive to receipt of the signal from the seismic data acquisition unit, the seismic data acquisition unit configured to exit the low power state and acquire seismic data in an operational state;
      receive, from the seismic data acquisition unit, the seismic data acquired by the seismic data acquisition unit in the operational state;
      measure a timing variation of a plurality of timestamps of the seismic data applied by the first clock in response to the seismic data received from the seismic data acquisition unit;
      produce a time variation function based on the measured timing variation, the time variation function configured to indicate a time offset and a frequency offset between the first clock and the second clock; and
      adjust the seismic data comprising the plurality of timestamps applied by the first clock using the time variation function to remove timing errors from the seismic data.

2. The system of claim 1, comprising:
   the data processing system to transmit, to the seismic data acquisition unit, a reference pulse per second based on the second clock; and
   the seismic data acquisition unit to use the reference pulse per second received from the data processing system to syntonize a frequency of the first clock to a frequency of the second clock.

3. The system of claim 1, comprising the data processing system configured to:
   synchronize, via the optical communications link, a time of the first clock to correspond to the second clock.

4. The system of claim 3, comprising the extraction vehicle configured to:
   acquire seismic data from the seismic data acquisition unit during a time window that is after synchronization of the first clock and overlaps syntonization of the second clock.

5. The system of claim 1, comprising:
   the data processing system to:
      identify a data frame clock signal via the optical communications link; and
      transmit, via the optical communications link, a data stream comprising the data frame clock signal; and
   the seismic data acquisition unit to:
      parse the data stream to identify the data frame clock signal and payload data;
      tune the first clock based on the data frame clock signal selected by the data processing system; and
      control operation of the seismic data acquisition unit responsive to an instruction embedded in the payload data.

6. The system of claim 1, comprising the data processing system to:
   transmit, via the optical communications link, one or more data frames to the seismic data acquisition unit, the one or more data frames configured to convey payload data to the seismic data acquisition unit and tune the first clock.

7. The system of claim 1, comprising:
   a plurality of seismic data acquisition units comprising a first seismic data acquisition unit and a second seismic data acquisition unit; and the data processing system configured to syntonize or synchronize the first clock of the first seismic data acquisition unit with a third clock of the second seismic data acquisition unit.

8. The system of claim 1, comprising:
the data processing system configured to calibrate a frequency of a logic device of the seismic data acquisition unit.

9. The system of claim 1, comprising:
the data processing system configured to:
syntonize and synchronize the first clock to the second clock;
measure a time delay between a signal transmitted from the extraction vehicle to the seismic data acquisition unit and returned to the extraction vehicle via the optical communications link; and
determine a distance between the extraction vehicle and the seismic data acquisition unit based on the time delay.

10. The system of claim 9, comprising:
the data processing system configured to determine the distance by accounting for circuit delays in the seismic data acquisition unit.

11. A method of performing a seismic survey in a marine environment, comprising:
positioning a seismic data acquisition unit on a seabed in the marine environment, the seismic data acquisition unit including a first clock;
establishing, by an extraction vehicle, an optical communications link with the seismic data acquisition unit, the extraction vehicle including a second clock, a transmitter, and a data processing system;
transmitting, by the data processing system, via the transmitter, a reference pulse based on the second clock;
syntonizing, by the data processing system, via the optical communications link, based on the transmitted reference pulse, the first clock of the seismic data acquisition unit to correspond to the second clock prior to the seismic data acquisition unit entering a low power state;
receiving, responsive to syntonization of the frequency of the first clock to the frequency of the second clock, a signal generated by the first clock from the seismic data acquisition unit, the signal indicating that the frequency of the first clock is syntonized with the frequency of the second clock;
instructing, by the data processing system, the seismic data acquisition unit to enter the low power state responsive to receipt of the signal from the seismic data acquisition unit, wherein the seismic data acquisition unit is configured to exit the low power state and acquire seismic data in an operational state;
receiving, by the data processing system, from the seismic data acquisition unit, the seismic data acquired by the seismic data acquisition unit in the operational state;
measuring, by the data processing system, a timing variation of a plurality of timestamps of the seismic data applied by the first clock in response to the seismic data received from the seismic data acquisition unit;
producing, by the data processing system, a time variation function based on the measured timing variation, the time variation function configured to indicate a time offset and a frequency offset between the first clock and the second clock; and adjusting, by the data processing system, the seismic data comprising the plurality of timestamps applied by the first clock using the time variation function to remove timing errors from the seismic data.

12. The method of claim 11, comprising:
transmitting, by the data processing system to the seismic data acquisition unit, one or more reference pulses based on the second clock; and
syntonizing, by the seismic data acquisition unit, the first clock using the one or more reference pulses received from the data processing system to syntonize the first clock.

13. The method of claim 11, comprising:
synchronizing, by the data processing system via the optical communications link, a time of the first clock to correspond to the second clock.

14. The method of claim 13, comprising:
syntonizing and synchronizing the first clock to the second clock; and
acquiring, by the extraction vehicle, seismic data from the seismic data acquisition unit after syntonization and synchronization of the first clock.

15. The method of claim 11, comprising:
selecting, by the data processing system, a data frame clock signal for the optical communications link; and
transmitting, by the data processing system via the optical communications link, a data stream comprising the data frame clock signal;
parsing, by the seismic data acquisition unit, the data stream to identify the data frame clock signal and payload data;
tuning, by the seismic data acquisition unit, the first clock based on the data frame clock signal selected by the data processing system;
controlling, by the seismic data acquisition unit, operation of a component of the seismic data acquisition unit responsive to an instruction embedded in the payload data.

16. The method of claim 11, comprising:
transmitting, by the data processing system, via the optical communications link, one or more data frames to the seismic data acquisition unit, the one or more data frames configured to convey payload data to the seismic data acquisition unit and tune the first clock.

17. The method of claim 11, comprising:
providing a plurality of seismic data acquisition units comprising a first seismic data acquisition unit and a second seismic data acquisition unit; and
syntonizing or synchronizing, by the data processing system, the first clock of the first seismic data acquisition unit with a third clock of the second seismic data acquisition unit.

18. The method of claim 11, comprising:
calibrating, by the data processing system, a frequency of a logic device of the seismic data acquisition unit.

19. The method of claim 11, comprising:
measuring, by the data processing system a time delay between a frame clock transmitted from the extraction vehicle to the seismic data acquisition unit and returned to the extraction vehicle via the optical communications link; and
determining, by the data processing system, a distance between the extraction vehicle and the seismic data acquisition unit based on the time delay.

* * * * *